United States Patent
Matsuzaki et al.

(10) Patent No.: US 8,409,393 B2
(45) Date of Patent: Apr. 2, 2013

(54) METHOD OF WELDING A COMPONENT PART TO A PLASTIC FUEL TANK

(75) Inventors: Toru Matsuzaki, Sakura (JP); Takumi Nakajima, Sakura (JP); Shunsuke Tsukahara, Sakura (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 13/307,518

(22) Filed: Nov. 30, 2011

(65) Prior Publication Data
US 2012/0138210 A1   Jun. 7, 2012

(30) Foreign Application Priority Data

Dec. 3, 2010   (JP) .................................. 2010-270663
Dec. 3, 2010   (JP) .................................. 2010-270667

(51) Int. Cl.
*B32B 37/00*   (2006.01)
(52) U.S. Cl. ........................................ 156/256; 156/499
(58) Field of Classification Search .................. 156/69, 156/250, 256, 499
See application file for complete search history.

(56) References Cited

U.S. PATENT DOCUMENTS

| | | | | |
|---|---|---|---|---|
| 4,971,639 A | * | 11/1990 | Quinn et al. ................. | 156/64 |
| 5,439,546 A | * | 8/1995 | Brickenstein ............... | 156/304.2 |
| 6,305,568 B1 | | 10/2001 | Suzuki et al. | |
| 7,455,326 B2 | * | 11/2008 | Matsuzaki et al. ......... | 285/288.1 |
| 2007/0000928 A1 | | 1/2007 | Nishiyama et al. | |
| 2009/0000686 A1 | | 1/2009 | Tsutsumi et al. | |

FOREIGN PATENT DOCUMENTS

| | | |
|---|---|---|
| JP | 2001113963 A | 4/2001 |
| JP | 2002192963 A | 7/2002 |
| JP | 2002235624 A | 8/2002 |
| JP | 2004300983 A | 10/2004 |
| JP | 2007008352 A | 1/2007 |
| JP | 2009006858 A | 1/2009 |

* cited by examiner

Primary Examiner — James Sells
(74) Attorney, Agent, or Firm — Marshall & Melhorn, LLC

(57) ABSTRACT

In welding a component part (20) to a tank main body (10) of a plastic fuel tank of a laminated structure, an annular upright wall (15) is formed in a tank main body wall so as to define an opening therein. An end surface of a weldable layer of the component part is welded to an outer surface of a weldable layer of the tank main body surrounding the annular upright wall to form a first welded part (31) and to an end surface of the weldable layer of the tank main body exposed at the top surface of the annular upright wall to form a second welded part (32) while the HC barrier layers (12, 24) are kept substantially aligned with each other at the interface between the two parts. Thereby, the required HC permeation blocking property and an adequate welding strength can be achieved at the same time.

13 Claims, 36 Drawing Sheets

METHOD OF WELDING A COMPONENT PART TO A PLASTIC FUEL TANK

TECHNICAL FIELD

The present invention relates to a method of welding a component part to a plastic fuel tank, and in particular to a method of welding a component part to an opening of a tank main body of a plastic fuel tank incorporated with a fuel permeation barrier layer.

BACKGROUND OF THE INVENTION

Plastic fuel tanks are gaining popularity because of the reduction in the weight and the high production efficiency which they provide. As high density polyethylene (HDPE) which is preferred as the material for blow molding lacks the barrier property against the permeation of hydrocarbon (HC), a gasoline tank made solely of HDPE is not acceptable for use because of the concern for polluting the atmosphere. Therefore, it has been customary to incorporate a fuel permeation barrier layer made of ethylene vinyl alcohol (EVOH) having a favorable barrier property against fuel permeation into the plastic fuel tank.

In such a fuel tank, the filler neck, vent valve and other components are typically molded by separate molding processes, and have to be welded to the tank main body. In particular, such component parts are not only required to be welded to the tank main body with an adequate mechanical strength but also without compromising the fuel permeation barrier property of the fuel tank. As a technology for eliminating discontinuities in the barrier layer that could be the cause of fuel permeation, it was proposed in JP2002-235624A to form an outwardly directed dome-shaped protuberance in a tank main body of a fuel tank made by laminating a weldable material layer made of HDPE and a HC barrier layer, form an opening in the tank main body by cutting off the dome-shaped protuberance along a plane cutting surface to expose the weldable material layer and the HC barrier layer in a concentric manner, and weld a component part to the exposed cutting surface such that the HC barrier of the tank main body abuts the HC barrier provided on the component part in a corresponding manner.

The HDPE used for manufacturing the tank main body often consists of recycled material containing a certain amount of impurities, instead of virgin material. In such a case, some effort is required to ensure the welding between the tank main body and the component part to be carried out in a reliable manner. Based on this consideration, it is conceivable to provide an additional weldable material layer made of pure HDPE around the existing weldable material layer made of recycled HDPE so that the component part may be welded to the additional weldable material layer.

However, when the above mentioned welding method is applied to a tank main body of a fuel tank including a recycled material layer, the surface area of the weldable layer exposed on the cut surface produced by the cutting of the outwardly directed dome-shaped protuberance is so small that an adequate welding strength cannot be achieved.

BRIEF SUMMARY OF THE INVENTION

In view of such problems of the prior art, a primary object of the present invention is to provide a method of welding a component part to a tank main body of a fuel tank incorporated with a HC barrier layer and a recycled material layer with an adequate welding strength and a high HC permeation blocking property.

According to the present invention, such an object can be accomplished by providing a method of welding a component part (20) provided with a peripheral wall including an inner HC barrier layer (23) and an outer weldable layer (24) and defining an annular lower end surface exposing end surfaces of the inner HC barrier layer and the outer weldable layer thereof to a tank main body (10) of a plastic fuel tank of a laminated structure including an inner layer (11), a HC barrier layer (12), a recycled material layer (13) made of recycled material and an outer weldable layer (14), in that order, the method comprising the steps of forming an annular upright wall (15) in a wall of the tank main body, the annular upright wall including an inner peripheral surface (15b) defining an opening (16) of the tank main body and an annular top surface (15a) exposing end surfaces of at least the HC barrier layer and the outer weldable layer; and welding the end surface of the weldable layer of the component part to an outer surface of the weldable layer of the tank main body surrounding the annular upright wall to form a first welded part (31) and to the end surface of the weldable layer of the tank main body exposed at the top surface of the annular upright wall to form a second welded part (32) while the HC barrier layers (12, 24) exposed at the top surface of the annular upright wall and the lower end surface of the peripheral wall of the component part, respectively, are kept substantially aligned with each other.

Thereby, the required HC permeation blocking property can be achieved owing to the alignment of the HC barrier layers of the two parts, and an adequate welding strength can be achieved by the welding connection to be achieved both at the first welded part and the second welded part. It should be noted that the up and down directions used in the disclosure and the claims of this application are only for the convenience of description, and should not be construed as limiting the present invention.

According to a certain aspect of the present invention, an annular recess is formed around the annular upright wall so as to define an annular space between the first welded part and the second welded part (first embodiment, FIG. 1).

The annular recess defines an annular space in cooperation with the opposing lower end surface of the peripheral wall of the component part which serves as a trap for capturing the flow of material from the welded parts so that impurities from the recycled material layer and other sources are prevented from being included in the welded parts, and the reliability of the welding strength can be improved.

According to another aspect of the present invention, the end surface of the weldable layer of the component part slightly is higher than the end surface of the HC barrier layer of the component part (modification of first embodiment, FIG. 3).

Thereby, a gap is created between the opposing end surfaces of the HC barrier layers, but is filled with the material of the weldable layers of the two parts so that the welding strength is improved on the one hand and the HC barrier property may be improved even when the opposing end surfaces of the HC barrier layers are jagged or otherwise fail to favorably correspond to each other.

According to yet another aspect of the present invention, the top surface of the annular upright wall is slightly higher than the outer surface of the weldable layer of the tank main body surrounding the annular upright wall, and the end surface of the weldable layer of the component part includes a base surface substantially flush with the end surface of the HC barrier layer of the component part and an annular protrusion formed along an outer periphery of the end surface of the weldable layer so as to define an annular space between the first welded part and the second welded part (second embodiment, FIG. 4)

In this case, the annular space serves as a trap for capturing the flow of material from the welded parts so that impurities from the recycled material layer and other sources are prevented from being included in the welded parts, and the reliability of the welding strength can be improved.

According to yet another aspect of the present invention, the end surface of the weldable layer of the component part is substantially flush with the end surface of the HC barrier layer of the component part, and the top surface of the annular upright wall is substantially flush with the outer surface of the weldable layer of the tank main body surrounding the annular upright wall (third embodiment, FIG. 6).

In this case, as the two welded parts are formed on a same plane, the surface shape of the heating plate may consist of a simple plane so that the structure f the heating plate can be simplified. Also as the surface shape of the tank main body around the opening can be simplified, and this simplifies the manufacturing process of the plastic fuel tank.

According to yet another aspect of the present invention, the top surface of the annular upright wall of the tank main body and a part of the outer surface of the weldable layer surrounding the annular upright wall are heated by using a heating plate provided with a base surface engaging the top surface of the annular upright wall and an annular projection engaging a part of the outer surface of the weldable layer surrounding the annular upright wall (fourth embodiment, FIG. 8).

According to this arrangement, the annular projection of the heating plate serves as a dam that blocks the flow of material that may contain impurities from the recycled material layer into the first welded part, and this contributes to the improvement in the welding strength. Furthermore, the annular projection of the heating plate controls the flow of the material during the welding process so that the welding finish can be optimized.

According to yet another aspect of the present invention, the end surface of the weldable layer of the component part includes a base surface substantially flush with the end surface of the HC barrier layer of the component part and an annular protrusion formed along an outer periphery of the end surface of the weldable layer, and the top surface of the annular upright wall of the tank main body is higher than a part of the outer surface of the weldable layer surrounding the annular upright wall so as to define an annular space between the first welded part and the second welded part; and wherein the top surface of the annular upright wall of the tank main body and a surrounding part of the tank main body is heated by a heating plate including a base surface engaging the top surface of the annular upright wall and an annular protrusion engaging the outer surface of the surrounding part of the tank main body, the height of the annular protrusion from the base surface being slightly greater than the height of the top surface of the annular upright wall from the surrounding part of the tank main body (fifth embodiment, FIG. 12-13).

According to this arrangement, the annular protrusion of the heating plate creates an annular dent in the outer surface of the outer weldable layer of the tank main body, and the annular protrusion formed along an outer periphery of the end surface of the weldable layer of the component part is allowed to be lodged in the annular dent so that a particularly strong welding connection can be achieved at the first welded part. Also, an annular space is created between the first welded part and second welded part that serves as a trap for capturing impurities that could compromise the quality of the welding between the weldable layers.

Preferably, the top surface of the annular upright wall of the tank main body and a surrounding part of the tank main body is heated by a heating plate including a central part configured to be pressed against the top surface of the annular upright wall and an annular part configured to be pressed against the surround part of the tank main body, the central part and the annular part of the heating plate being disposed in a mutually slidable relationship in a direction for moving the heating plate toward the tank main body.

The annular upright wall can be conveniently formed by forming an outwardly directed dome-shaped protuberance in the tank main body and cutting off the dome-shaped protuberance from the tank main body along a base part thereof

BRIEF DESCRIPTION OF THE DRAWINGS

Now the present invention is described in the following with reference to the appended drawings, in which.

DETAILED DESCRIPTION OF THE PREFERRED EMBODIMENT(S)

Figure 1:
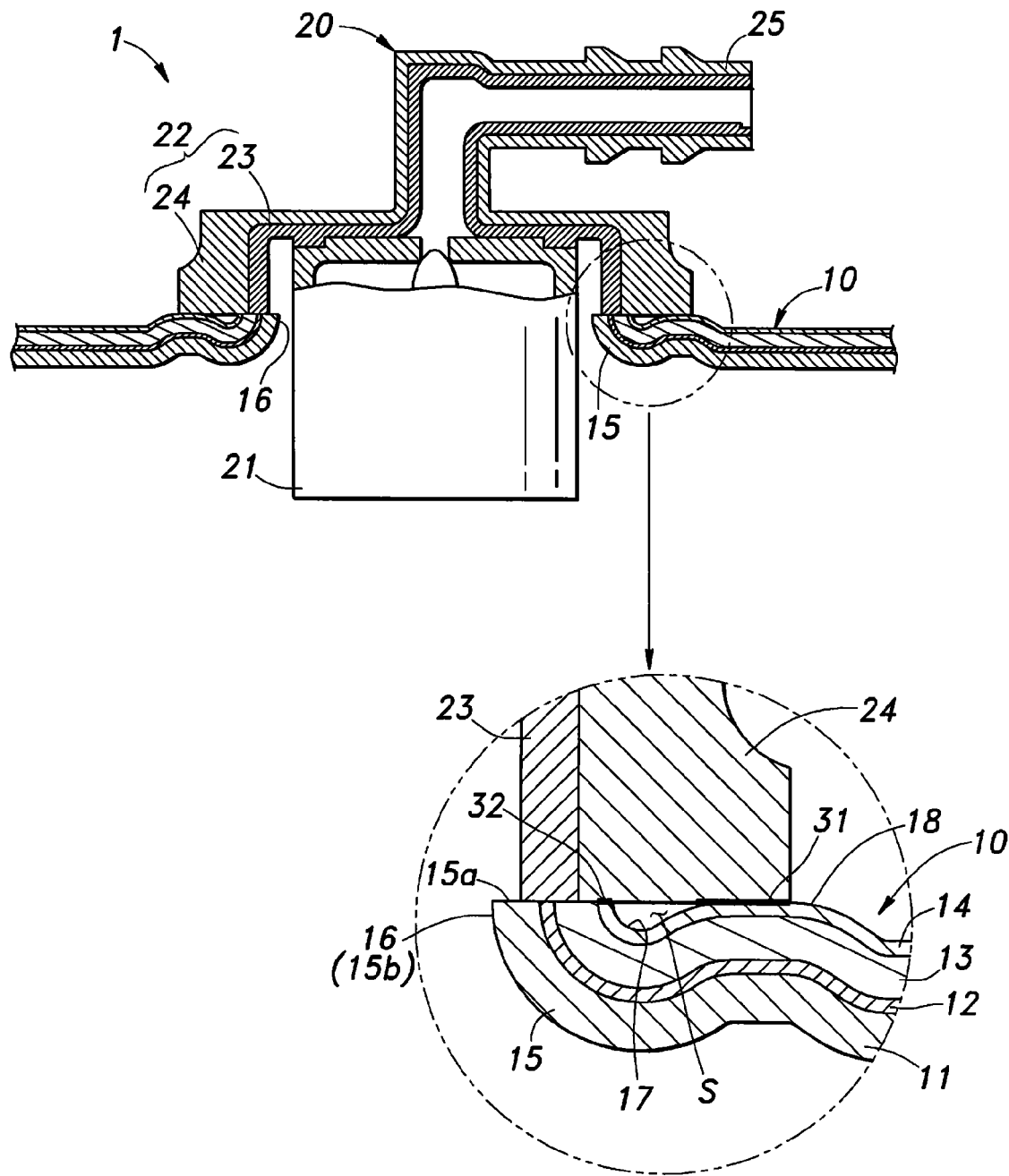
FIG. 1 is a vertical sectional view of a plastic fuel tank incorporated with a vent valve according to a first embodiment of the present invention.

Referring to FIG. 1, a fuel tank 1 comprises a tank main body 10 having an opening 16 in an upper wall thereof and a component part consisting of a vent valve 20 passed into the tank main body 10 from the opening 16 and attached to a peripheral part of the opening 16 at an upper end thereof from outside.

The tank main body 10 is made by a blow molding process, and is provided with a laminated structure including four layers, an inner lining layer 11 made of HDPE, a HC barrier layer 12 made of EVOH, a recycled material layer 13 primarily made of recycled HDPE and an outermost weldable layer 14 made of pure HDPE, combined in that order from inside to outside. A bonding layer not shown in the drawing may be present between the inner lining layer 11 and HC barrier layer 12, and between the HC barrier layer 12 and the recycled material layer 13 to ensure secure attachment between the adjoining layers, but such bonding layers are disregarded in the following description as they are not relevant to the description of the present invention.

Figure 2:
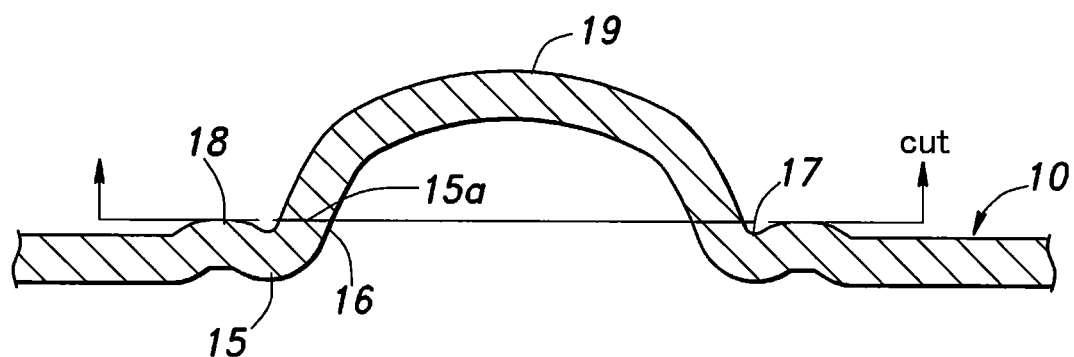
FIG. 2 is an enlarge fragmentary sectional view showing an outwardly directed dome-shaped protuberance formed in an upper wall of the tank main body as a preliminary step to forming an annular upright wall defining an opening in the tank main body.

The opening 16 is formed by first forming an outwardly directed dome-shaped protuberance 19 in the tank main body 10 as shown in FIG. 2, and slicing off a base part of the dome-shaped protuberance 19 along a plane which may be either flat or curved. Therefore, the opening 16 is defined by an inner circumferential surface 15b of an annular upright wall 15, and the cutting plane defines an annular top surface 15a of the annular upright wall 15 which is directed outward and extends along the entire periphery of the opening 16. In particular, the annular upright wall 15 is surrounded by an annular recess 17 which is in turn surrounded by an annular protuberance 18. The bottom surface of the annular recess 17 is lower than the top surface 15a of the annular upright wall 15, and the annular protuberance 18 is provided with a flat top surface which is at a substantially same elevation as the top surface 15a of the annular upright wall 15. In the illustrated embodiment, the part of the tank main body 10 surrounding the annular protuberance 18 is recessed with respect to the top surface of the annular protuberance 18, but may be at the same elevation as the top surface of the annular protuberance 18 without departing from the spirit of the present invention as can be readily appreciated by a person skilled in the art.

The annular upright wall 15 extends substantially perpendicularly to the major plane of the upper wall of the tank main body 10 in this and the following embodiments, but may be cone shaped or may extend at an angle with respect to the major plane of the upper wall of the tank main body 10 without departing from the spirit of the present invention. Similarly, the top surface 15a of the annular upright wall 15 is parallel to the major plane of the upper wall of the tank main body 10 in this and the following embodiments, but may also be slanted or curved as long as the opposing end surface of the lid part 22 are configured to conform to such a surface. The vent valve 20 is typically made by an injection molding process, and comprises a valve main body 21 passed into the opening 16, a lid part 22 supporting the upper end of the valve main body 21 and attached to the peripheral part of the upper wall of the tank main body 21 from outside and a nozzle 25 formed in the lid part 22 for communicating the interior of the vent valve 20 with a canister not shown in the drawing via a vent pipe also not shown in the drawing. The lid part 22 is molded separately from the valve main body 21, and includes an inner HC barrier layer 23 made of polyamide plastic (PA) or the like and an outer weldable layer 24 made of HDPE or modified polyethylene which may be combined by a co-injection molding (over-molding) process. The lid part 22 is provided with a cylindrical peripheral wall defining an open bottom end. The nozzle 25 is also provided with an inner layer consisting of the HC barrier layer 23 and an outer layer consisting of the weldable layer 25.

The lower end surface of the peripheral wall of the lid member 22 defines a flat annular end surface that conforms with and abuts the top surface 15a of the annular upright wall 15 and the flat annular top surface of the annular protuberance 18 of the tank main body 10. In this conjunction, owing to the presence of the annular recess 17, an annular space S is defined in the interface between the lower end surface of the peripheral wall of the lid member 22 and the annular mating surface surrounding the opening 16 of the tank main body 10. In particular, the lower end surface of the weldable layer 24 of the lid member 22 abuts the end surface of the outermost weldable layer 14 at the top surface 15a of the annular upright wall 15 and the flat top surface of the annular protuberance 18 consisting of the weldable layer 14.

The vent valve 20 is attached to the tank main body 10 by welding the weldable layer 24 of the lid part 22 to the weldable layer 14 of the tank main body 10 while the end surface of the HC barrier layer 12 exposed at the top surface 15a of the annular upright wall 15 abuts the opposing end surface of the HC barrier layer 23 of the lid part 22. In particular, the weldable layer 24 of the lid part 22 is welded to the weldable layer 14 of the tank main body 10 at the top surface 15a of the annular upright wall 15 (a first annular welded part 31) and the weldable layer 14 defining the top surface of the annular protuberance 18 (a second annular welded part 32). The space S defined by the annular recess 17 in cooperation with the opposing end surface of the lid part 22 receives the material of the weldable layers 14 and 24 which softens or melts when these two parts are heated and pushed against each other during the welding process.

The process of manufacturing this fuel tank 1 is described in the following. As shown in FIG. 2, the tank main body 10 of the four-layer structure is blow molded such that an outwardly directed dome-shaped protuberance 19 is formed in an upper wall of the tank main body 10, and the annular recess 17 and the annular protuberance 18 are formed around the dome-shaped protuberance 19 at the same time. The dome-shaped protuberance 19 is then sliced off at the same height as the top surface of the annular protuberance 18 so that the opening 16 and the annular upright wall 15 are formed at the same time. In FIG. 2, the various layers 11 to 14 of the tank main body 10 are omitted from the illustration.

The top surface 15a of the annular upright wall 15 and the lower end surface of the peripheral part of the lid member 22 are welded to each other by using a heated plate. This causes the opposing ends of the HC barrier layer 12 of the tank main body 10 and the HC barrier layer 23 of the lid part 22 to abut each other in a continuous manner The welded part is allowed to cool off thereafter. Thereby, the two parts are firmly welded to each other by the welded parts thereof. In particular, the weldable layer 14 presents a relatively large surface on the top surface 15a of the annular upright wall 15 of the tank and on the annular top surface of the annular protuberance 18 that can be welded to the opposing end surface of the weldable layer 24 of the lid part 22 so that a particularly firm welding connection can be accomplished.

Furthermore, in this fuel tank 1, as the HC barrier layer 12 exposed at the top surface 15a of the annular upright wall 15 abuts the HC barrier layer 23 exposed from the opposing end surface of the lid part 22 substantially without any gap between them, the welded part is provided with a barrier property comparable to those of the lid part 22 and the tank main body 10.

Owing to the presence of the annular recess 17, any excess material that may flow from the two annular welded parts 31 and 32 can be trapped in the space S defined by the annular recess 17 so that the second annular welded part 32 is protected from the intrusion of any foreign matter that may be produced from the first annular welded part 31 that could involve the welding of the recycled material. Furthermore, the presence of the annular upright wall 15, the annular recess 17 and/or the annular protuberance 18 contributes to the increase in the stiffness of the part surrounding the opening 16 of the tank main body 10.

Figure 3A:
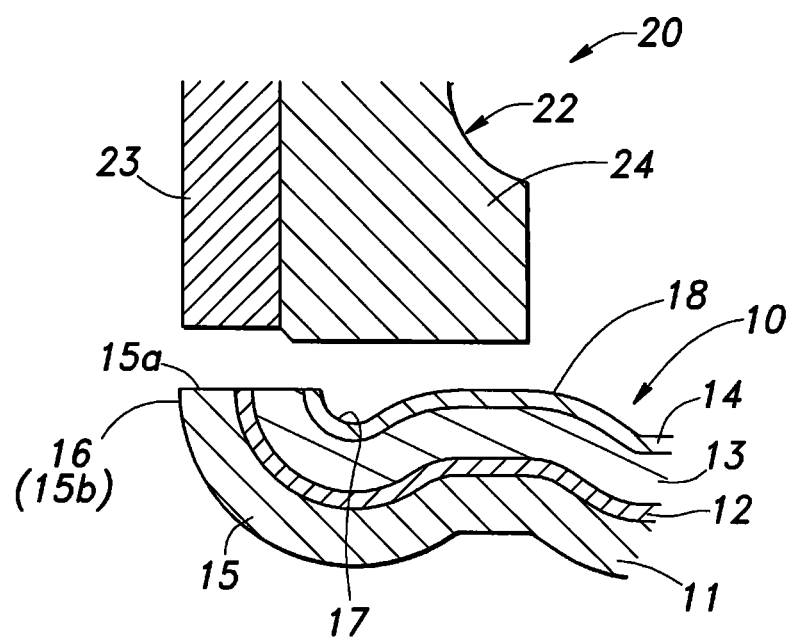
FIGS. 3a and 3b are fragmentary sectional views showing a modification of the first embodiment of the present invention.
Figure 3B:
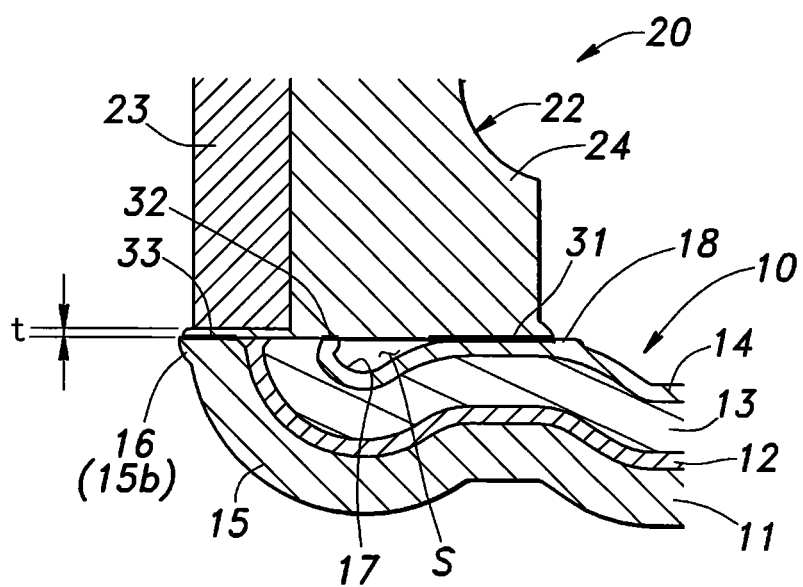

FIGS. 3a and 3b show a modification of the first embodiment of the method of welding a component part to a plastic fuel tank according to the present invention. The end surface of the weldable layer 24 of the lid part 22 protrudes slightly as compared with the end surface of the adjacent HC barrier layer 23 as shown in FIG. 3a. Therefore, when the lower surface of the lid part 22 is heated, and the lid part 22 is pushed against the top surface 15a of the annular upright wall 15, the material of the weldable layer 24 of the lid part 22 is allowed to flow into the gap t defined between the opposing ends of the HC barrier layers 23 and 12 of the two parts and welded to the end surface of the inner lining layer 11 (a third welded part 33) as shown in FIG. 3b.

More specifically, when the two parts are welded to each other, a small gap t is defined between opposing ends of the HC barrier layers 23 and 12 of the two parts, and filled primarily by the material of the weldable layer 24 of the lid part 22. This gap t is so small that fuel permeation through this gap t is negligible. On the other hand, the filling of this gap t with the material of the weldable layer 24 of the lid part 22 contributes to the welding strength of the two parts, and may even reduce the amount of fuel permeation through the welded part when the opposing ends of the two HC barrier layers 12 and 23 do not closely abut each other and create a gap between them.

Figure 4:
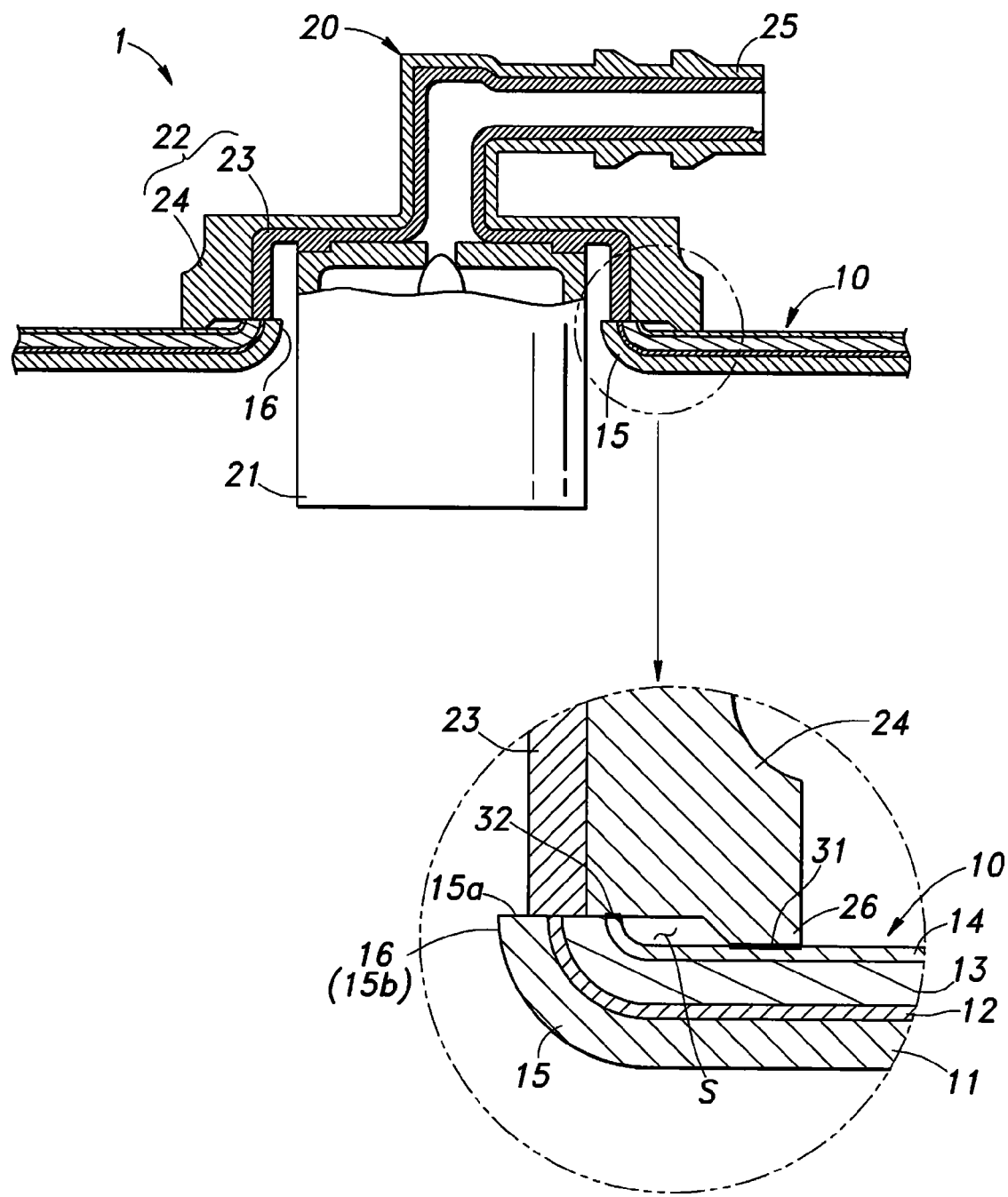
FIG. 4 is a view similar to FIG. 1 showing a second embodiment of the present invention.

FIG. 4 shows a second embodiment of the present invention. In FIG. 4, the parts corresponding to those of the first embodiment are denoted with like numerals without repeating the description of such parts.

In the second embodiment, an opening 16 of the tank main body 10 is defined by an annular upright wall 15, but the part of the tank main body 10 surrounding the annular upright wall 15 is generally flat and lower than the upper top surface 15a of the annular upright wall 15.

The lower end surface of the peripheral part of the lid part 22 of the vent valve 20 is provided with an annular protrusion 26 (protruding in the axial direction) along the outermost peripheral part thereof, and the remaining part of the lower end surface of the weldable layer 24 or the inner peripheral part of the lower end surface of the weldable layer 24 defines a base surface which is recessed with respect to the annular protrusion 26 and flush with the end surface of the HC barrier layer 23.

When the lid part 22 is welded to the tank main body 10, the annular protrusion 26 is welded with the opposing outer surface (upper surface in the illustrated embodiments) of the tank main body 10 defined by the weldable layer 14 thereof (first welded part 31). At the same time, the end surface of the weldable layer 14 abuts the base surface of the weldable layer 24 of the lid part 22, and is welded thereto (second welded part 32). In this embodiment also, when the lid part 22 is welded to the tank main body 10, the opposing ends of the HC barrier layers 12 and 23 of the two parts abut each other in a continuous manner.

The outer periphery of the annular upright wall 15 is located radially inward to the inner periphery of the annular protrusion 26 so that an annular space S is defined between the annular upright wall 15 and the annular protrusion 26. This annular space S performs the function of receiving the flow of the material of the weldable layers 14 and 24 during the welding process similarly as the previous embodiment.

The height of the annular protrusion 26 from the base surface may be about equal to or slightly higher than the height of the top surface 15a of the annular upright wall 15 from the outer surface of the outer surface of the weldable layer 14 surrounding the annular upright wall 15 of the tank main body 10.

In this embodiment also, the HC barrier layer 12 of the annular upright wall 15 and the HC barrier layer 23 of the lid member 22 extend continuously one from the other across the welding surface between the two parts so that a favorable HC barrier property can be achieved. Furthermore, as the welding between the two parts is performed over a large welding area so that the welded part can be given with a high mechanical strength.

Figure 5A:
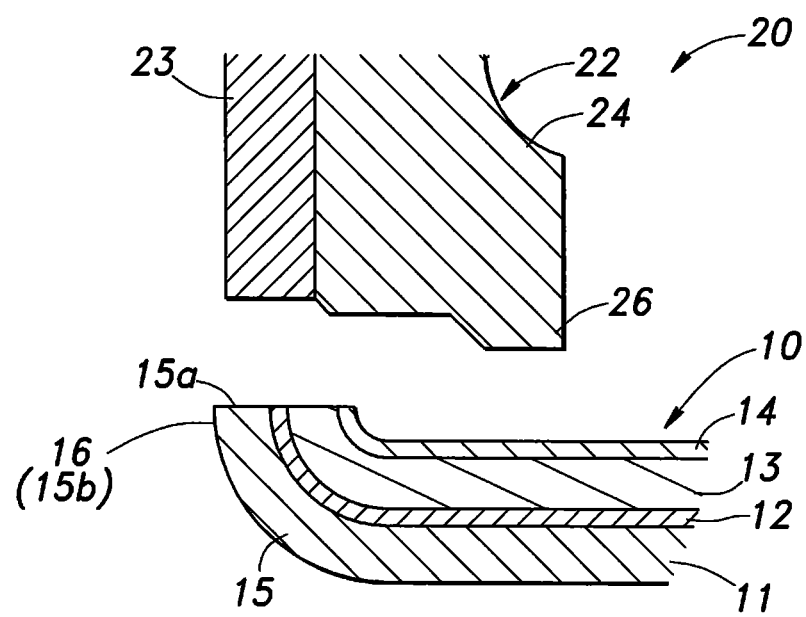
FIGS. 5a and 5b are views similar to FIGS. 3a and 3b showing a modification of the second embodiment of the present invention.
Figure 5B:
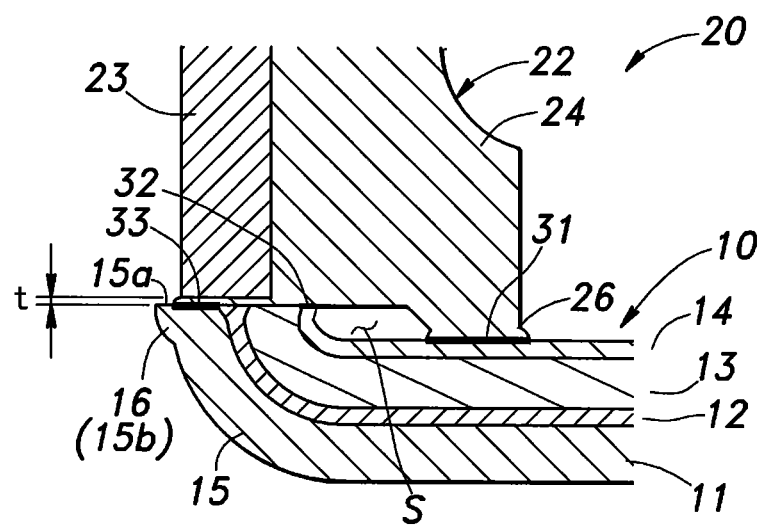

FIGS. 5a and 5b show a modification of the second embodiment. The base surface of the end surface of the weldable layer 24 of the lid part 22 protrudes slightly as compared with the end surface of the adjacent HC barrier layer 23 as shown in FIG. 5a. Therefore, when the lower surface of the lid part 22 is heated, and the lid part 22 is pushed against the top surface 15a of the annular upright wall 15, the material of the weldable layer 24 of the lid part 22 flows into the gap t between the opposing ends of the HC barrier layers 23 and 12 of the two parts and welded to the end surface of the inner lining layer 11 (a third welded part 33).

As a result, when the two parts are welded to each other, a small gap t is defined between the opposing ends of the HC barrier layers 23 and 12 of the two parts, and filled by the material of the weldable layer 24 of the lid part 22. This gap t is so small that fuel permeation through this gap t is negligible. On the other hand, the filling of this gap t with the material of the weldable layer 24 of the lid part 22 contributes to the welding strength of the two parts, and may even reduce the amount of fuel permeation through the welded part when the opposing ends of the two HC barrier layers 12 and 23 do not closely abut each other and create a gap between them as shown in FIG. 5b.

Figure 6:
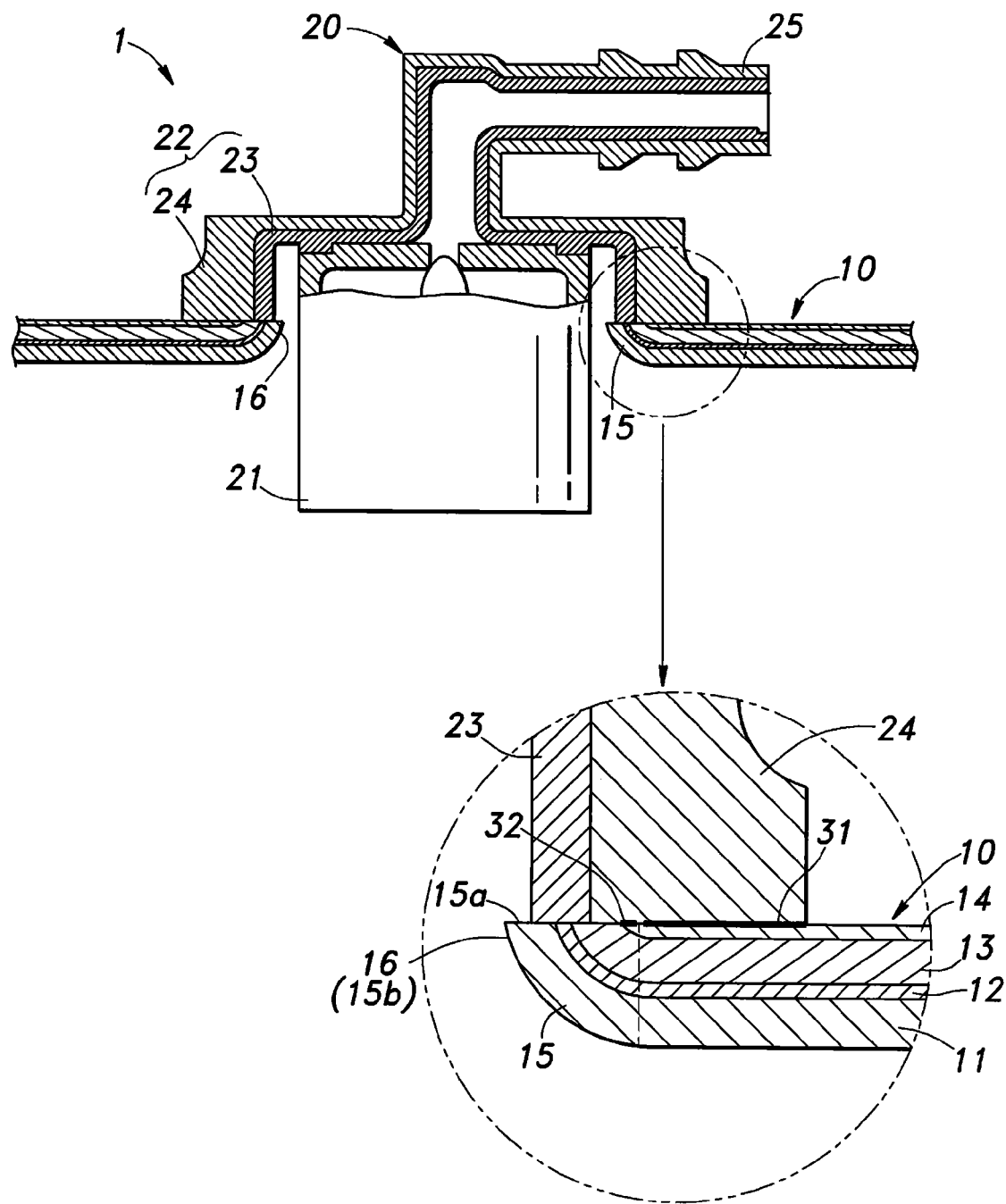
FIG. 6 is a view similar to FIG. 1 showing a third embodiment of the present invention.

FIG. 6 shows a third embodiment of the present invention. In FIG. 6, the parts corresponding to those of the previous embodiments are denoted with like numerals without repeating the description of such parts.

In this embodiment, the opening 16 of the tank main body 10 is defined by an annular upright wall 15 which in this case is provided with a top surface 15a flush with the outer surface of the weldable layer 14 surrounding the annular upright wall 15 of the tank main body 10. The inner circumferential surface 15b of the annular upright wall 15 is provided with a curved wall surface defining a quarter of a circle in the vertical cross section shown in FIG. 6. The end surfaces of the inner lining layer 11 made of HDPE, the HC barrier layer 12 and the recycled material layer 13 primarily made of recycled HDPE are exposed at the top surface 15a of the annular upright wall 15 in a concentric manner The top surface 15a is immediately surrounded by the outer surface of the outermost weldable layer 14.

The lower end surface of the peripheral part of the lid part 22 of the vent valve 20 is flat, and exposes the end surfaces of the HC barrier layer 23 and the weldable layer 24 in a concentric manner.

Figure 7A:
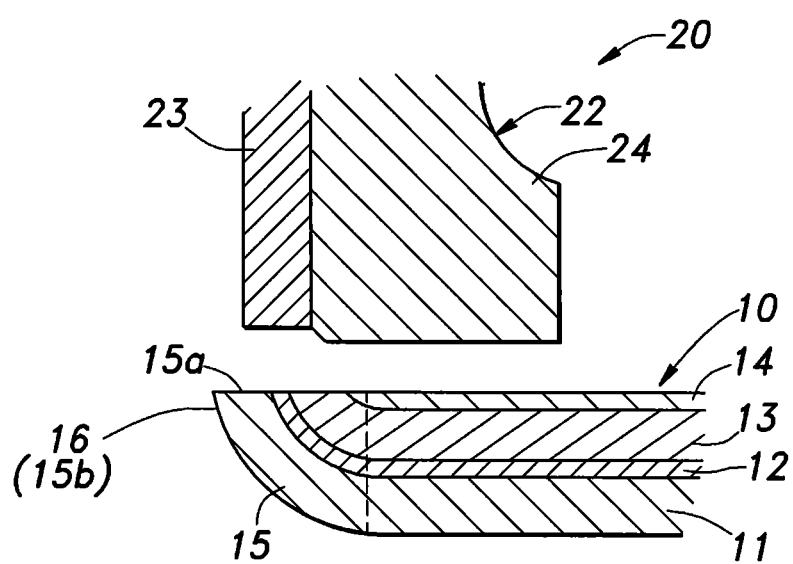
FIGS. 7a and 7b are views similar to FIGS. 3a and 3b showing a modification of the third embodiment of the present invention.
Figure 7B:
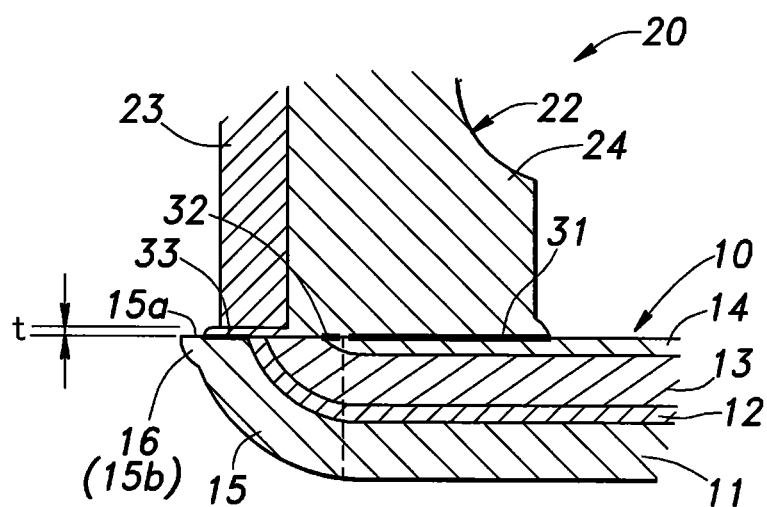

When the vent valve 20 is placed on the opening 16 of the tank main body for welding the two parts to each other, the HC barrier layer 12 and 23 of the two parts abut each other in a continuous manner for an effective blocking of HC permeation while the lower end of the weldable layer 24 of the lid part 22 is welded to the outer surface of the outermost weldable layer 14 of the tank main body 10. In this case, the first welded part 31 between the end surface of the weldable layer 24 and the outer surface of the weldable layer 14, and the second welded part 32 between the end surface of the weldable layer 24 and the end surface of the weldable layer 14 merge into a single welded part, but a strong welding connection can still be achieved between the two parts. FIG. 7 shows a modification of the third embodiment. In this case also, the end surface of the weldable layer 24 of the lid part 22 protrudes slightly as compared with the end surface of the adjacent HC barrier layer 23 as shown in FIG. 7a. Therefore, when the lower surface of the lid part 22 is heated, and the lid part 22 is pushed against the top surface 15a of the annular upright wall 15, the material of the weldable layer 24 of the lid part 22 is allowed to flow into the gap t between the opposing ends of the HC barrier layers 23 and 12 of the two parts and welded to the end surface of the inner lining layer 11 (a third welded part 33) as shown in FIG. 7b.

As a result, when the two parts are welded to each other, a small gap t is defined between opposing ends of the HC barrier layers 23 and 12 of the two parts, and filled by the material of the weldable layer 24 of the lid part 22. This gap t is so small that fuel permeation through this gap t is negligible. On the other hand, the filling of this gap t with the material of the weldable layer 24 of the lid part 22 contributes to the welding strength of the two parts, and may even reduce the amount of fuel permeation through the welded part when the opposing ends of the two HC barrier layers 12 and 23 do not closely abut each other and create a gap between them.

Figure 8:
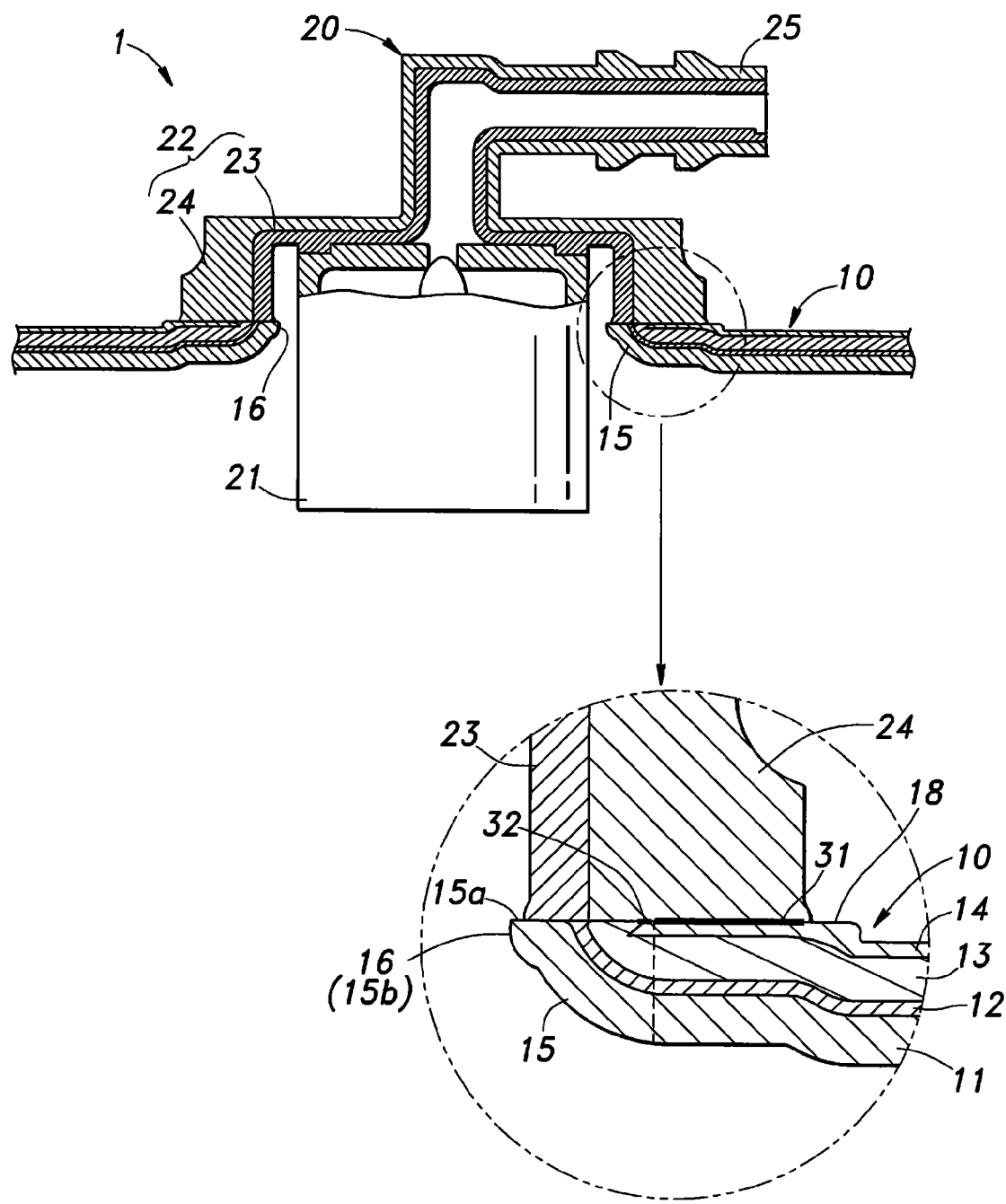
FIG. 8 is a view similar to FIG. 1 showing a fourth embodiment of the present invention.

FIGS. 8 to 10 show a fourth embodiment of the present invention. Referring to FIG. 8, an opening 16 is formed in an upper wall of a tank main body 10 of a fuel tank 1. In particular, the opening 16 of the tank main body 10 is defined by an annular upright wall 15 which in this case is provided with a top surface 15a flush with the immediately surrounding outer surface of the tank main body 10 which is defined by an outer surface of the weldable layer 14 and raised as compared with the general top surface of the tank main body 10. The inner circumferential surface 15b of the annular upright wall 15 is provided with a curved wall surface defining a quarter of a circle in the vertical cross section shown in FIG. 8. The end surfaces of the inner lining layer 11 made of HDPE, the HC barrier layer 12 and the recycled material layer 13 primarily made of recycled HDPE are exposed at the top surface 15a in a concentric manner.

The top surface 15a is immediately surrounded by an annular protuberance 18 having a top surface continuous with the top surface 15a and at the same elevation as the top surface 15a. The annular protuberance 18 is surrounded by the outer surface of the outermost weldable layer 14 which forms the general top surface of the tank main body 10 which is slightly recessed with respect to the top surface 15a and the top surface of the annular protuberance 18. If desired, the annular protuberance 18 may be omitted so that the top surface 15a of the annular upright wall 15 is directly surrounded by the general top surface of the tank main body 10 which is slightly recessed with respect to the top surface 15a of the annular upright wall 15.

The lower surface of the peripheral part of the lid part 22 is defined by a single plane which exposes the end surfaces of the HC barrier layer 23 and the weldable layer 24 thereof The two parts are welded to each other by abutting the exposed and opposing ends of the HC barrier layer 12 and 23 of the two parts and welding the end surface of the weldable layer 24 of the lid part 22 to the outer surface of the outermost weldable layer 14 of the tank main body 10. In this case, the first welded part 31 between the end surface of the weldable layer 24 and the outer surface of the weldable layer 14, and the second welded part 32 between the end surface of the weldable layer 24 and the end surface of the weldable layer 14 merge into a single welded part, but a strong welding connection can still be achieved between the two parts.

Figure 9A:
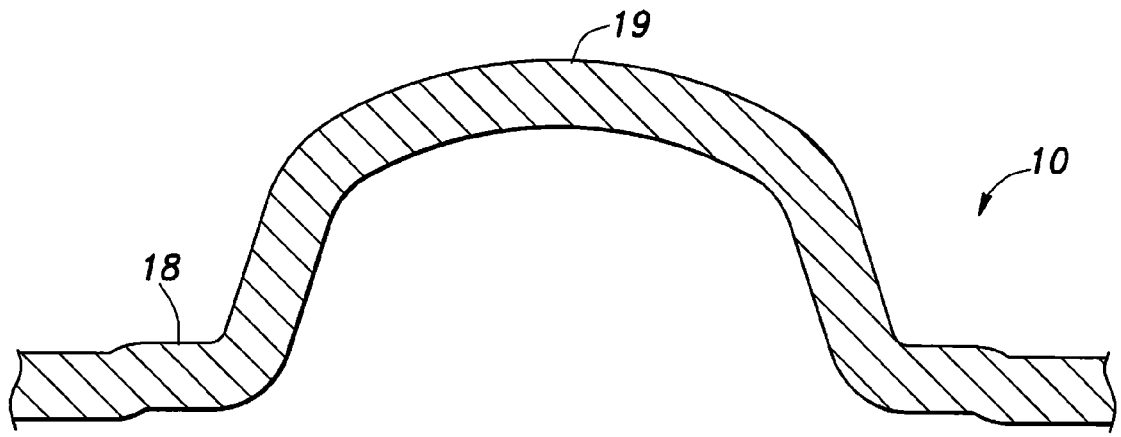
FIGS. 9a and 9b are enlarged fragmentary sectional views showing the different steps of forming an outwardly directed dome-shaped protuberance in an upper wall of the tank main body, and forming an annular upright wall defining an opening in the tank main body by cutting the outwardly directed dome-shaped protuberance at a base part thereof.
Figure 9B:
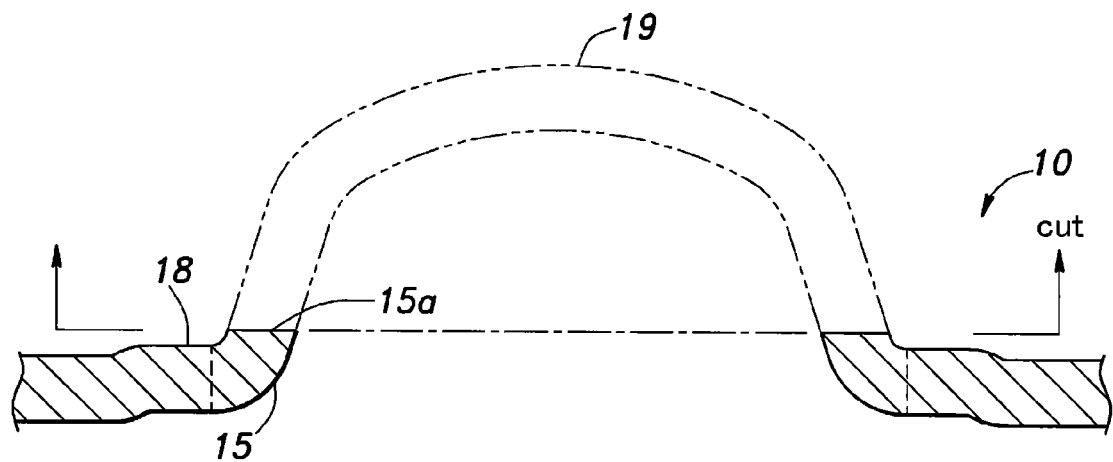

The method of manufacturing this fuel tank 1 is described in the following. The tank main body 10 is made by a blow molding process, and an outwardly directed outwardly directed dome-shaped protuberance 19 is formed in the tank main body 10 at the same time as illustrated in FIG. 9a. The outwardly directed dome-shaped protuberance 19 is cut off by using a cutting tool such as a rotating knife or saw at an elevation slightly higher than the top surface of the annular protuberance 18 so that the opening 16 is defined by an annular upright wall 15 forming the base part of the dome-shaped protuberance 19. In FIGS. 9a and 9b, only the profile of the tank main body 10 is illustrated, and the layered structure of the wall of the tank main body 10 is omitted from illustration.

The cutting tool typically consists of a disk and a rotary shaft is centrally passed through the center of the disk and protrudes slightly to the other side of the cutting tool. However, owing to the presence of the annular protuberance 18, the cutting tool is enabled to cut the dome-shaped protuberance 19 at a height only slightly higher than the annular protuberance 18 or even substantially at a same height as the annular protuberance 18 by placing the rotary shaft for the cutting tool clear from or outside the annular protuberance 18.

Figure 10A:
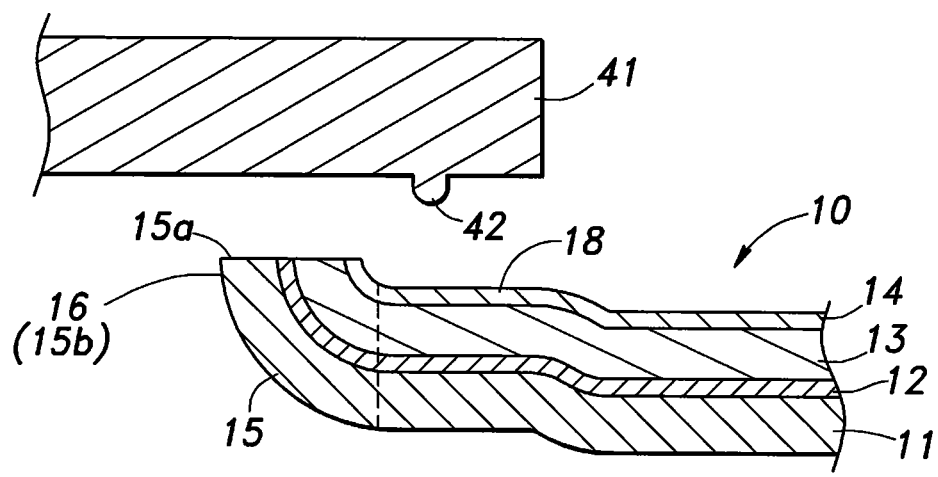
FIGS. 10a to 10f are fragmentary sectional views showing the different steps of welding a component part to the tank main body according to the fourth embodiment of the present invention.
Figure 10B:
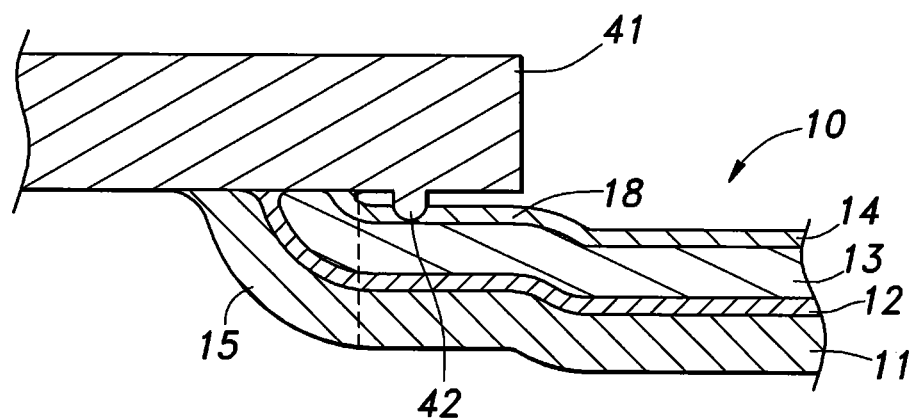
Figure 10C:
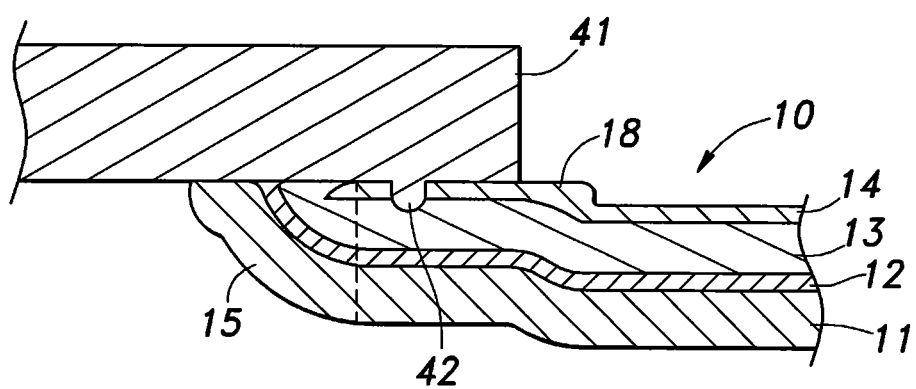

Once the opening 16 is formed as described above, a heating plate 41 is applied to the top surface 15a of the annular upright wall 15 and the surrounding area of the tank main body 10 as shown in FIG. 10a. The heating plate 41 is provided with a lower surface that is configured to engage the top surface 15a of the annular upright wall 15 and the surrounding part of the upper wall of the tank main body 10, but is also provided with an annular projection (ridge) 42 opposing the top surface of the annular protuberance 18 and the height of this annular projection 42 is slightly greater than the height of the top surface 15a of the annular upright wall 15 from the top surface of the annular protuberance 18.

As the heating plate 41 is moved toward the top surface 15a of the annular upright wall 15, the annular projection 42 is pushed into the weldable layer 14 of the top surface of the annular protuberance 18 before the general lower surface of the heating plate 41 is pressed against the top surface 15a of the annular upright wall 15. As a result, the material of the recycled material layer 13 and the weldable layer of the tank main body 10 that is softened by the heat and pressure from the general surface of the heating plate 41 and flowing outward is blocked by the annular projection 42. This causes the recycled material layer 13 to be overlayed onto the weldable layer 14, and a part of the material of the recycled material layer 13 to form an overhang under which the end part of the weldable layer 14 is lodged. This increases the force of attachment between the recycled material layer 13 and the weldable layer 14. Also, the annular projection 42 creates a corresponding dent in the weldable layer 14.

Figure 10D:
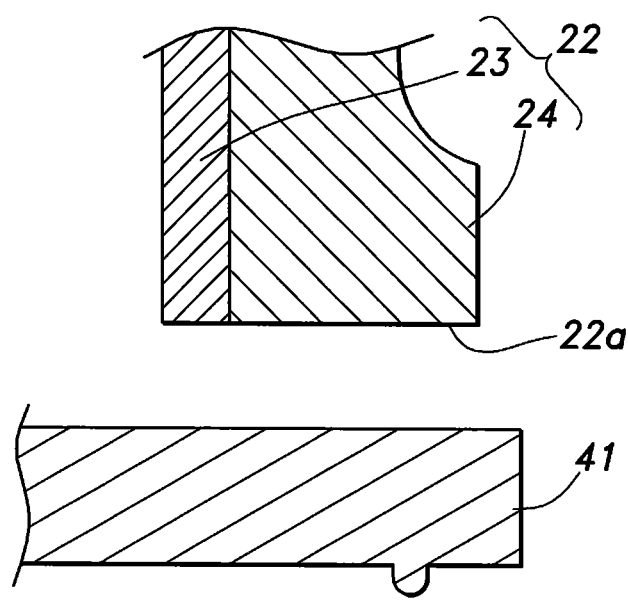
Figure 10E:
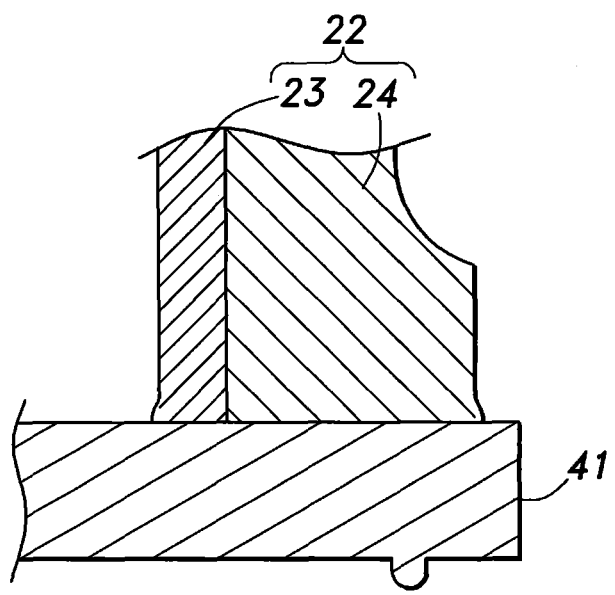

At the same time (or sequentially), the upper surface of the heating plate 41 is pushed against the lower surface 22a of the outer periphery of the lid part 22 to soften or partly melt the material of the weldable layer 24 thereof as shown in FIGS. 10d and 10e.

Thereafter, the vent valve 20 is attached to the tank main body 10 by welding the weldable layer 24 of the lid part 22 to the weldable layer 14 of the tank main body 10 while the HC barrier layer 12 exposed at the top surface 15a of the annular upright wall 15 abuts the opposing end of the HC barrier layer 23 of the lid part 22. In particular, the weldable layer 24 of the lid part 22 is welded to the weldable layer 14 of the tank main body 10 both at the top surface 15a of the annular upright wall 15 (a first annular welded part 31) and at the top surface of the annular protuberance 18 (a second annular welded part 32).

The welded part is allowed to cool off thereafter. Thereby, the two parts are firmly welded to each other by the weldable layers thereof. In particular, the weldable layer 14 presents a relatively large surface on the top surface 15a of the annular upright wall 15 of the tank, and on the annular top surface of the annular protuberance 18 that can be welded to the opposing end surface of the weldable layer 24 of the lid part 22 so that a particularly firm welding connection can be accomplished. In particular, a part of the material of the weldable layer 24 of the lid part 22 flows into the dent created in the weldable layer 14 of the tank main body 10, a particularly favorable welding attachment can be thereby achieved.

Figure 10F:
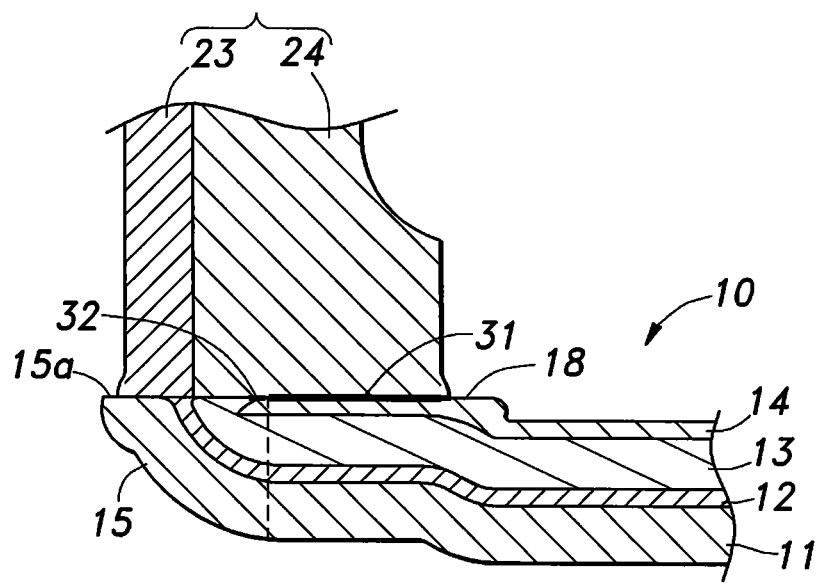

According to this embodiment, even when the top surface 15a of the annular upright wall 15 is slightly higher than the top surface of the surrounding annular protuberance 18 owing to the need to cut the dome-shaped protuberance 19 without damaging the surrounding annular protuberance 18 because of the presence of the annular projection 42 in the heating plate 41, the material of the tank main body (the recycled material layer 13 and the weldable layer 14) can be contained within a prescribed area so that the part of the weldable layer 14 outside the annular projection 42 is protected from the inclusion of any foreign matter from such part as the recycled material layer 13, and a firm welding attachment can be ensured between the weldable layers 14 and 24 of the two parts as shown in FIG. 10f.

Figure 11A:
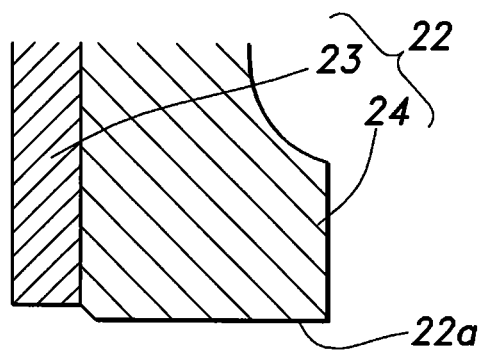
FIGS. 11a to 11c are views similar to FIGS. 10d to 10f showing a modification of the fourth embodiment of the present invention.
Figure 11A:
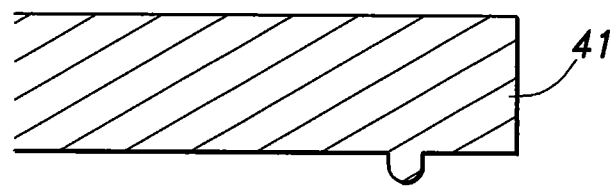
Figure 11B:
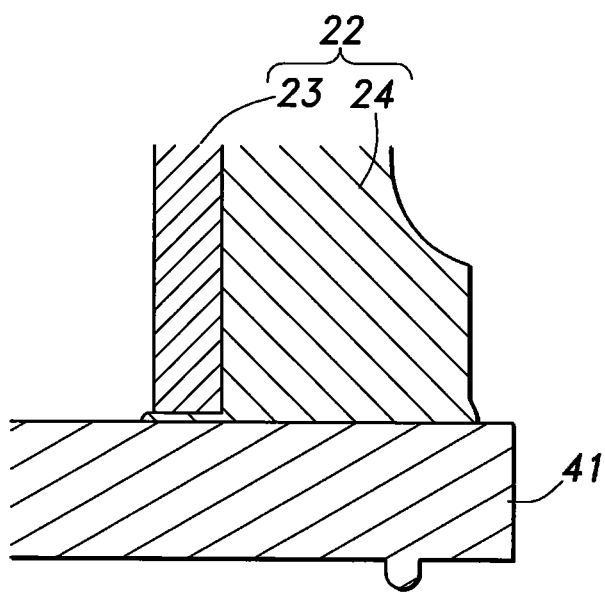
Figure 11C:
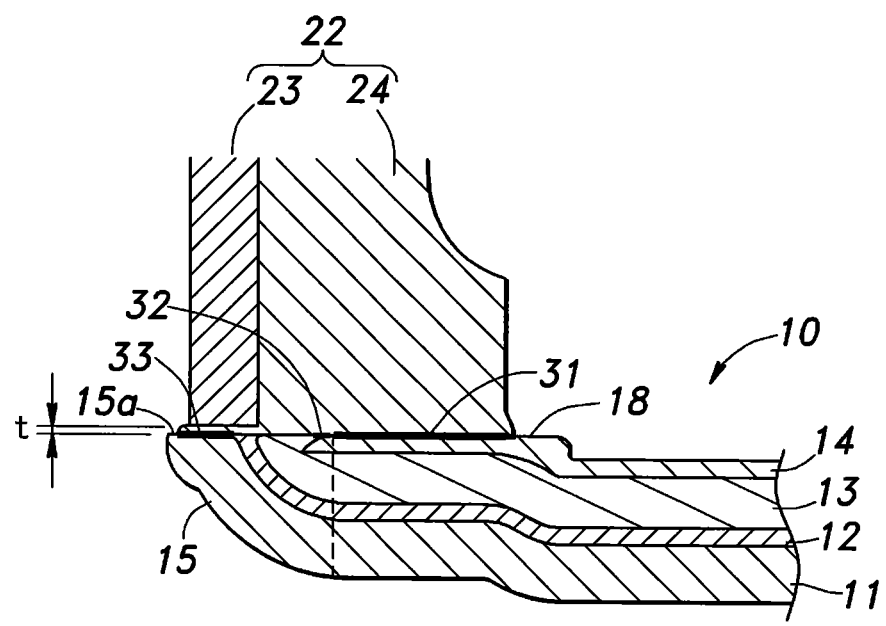

FIGS. 11a to 11c show a modification of the fourth embodiment. This embodiment differs from the previous embodiment in that the end surface of the weldable layer 24 of the lid part 22 protrudes slightly as compared with the end surface of the adjacent HC barrier layer 23 as shown in FIG. 11a. Therefore, when the lower surface of the lid part 22 is heated, and the lid part 22 is pushed against the top surface of the annular upright wall 15, the material of the weldable layer 24 of the lid part 22 is allowed into the gap between the opposing ends of the HC barrier layers 23 and 12 of the two parts and welded to the end surface of the inner lining layer 11 (a third welded part 33) as shown in FIG. 11b.

As a result, when the two parts are welded to each other, a small gap t is defined between opposing ends of the HC barrier layers 23 and 12 of the two parts, and filled by the material of the weldable layer 24 of the lid part 22 as shown in FIG. 11c. This gap t is so small that fuel permeation through this gap t is negligible. On the other hand, the filling of this gap t with the material of the weldable layer 24 of the lid part 22 contributes to the welding strength of the two parts, and may even reduce the amount of fuel permeation through the welded part when the opposing ends of the two HC barrier layers 12 and 23 do not closely abut each other and create a gap between them.

Figure 12:
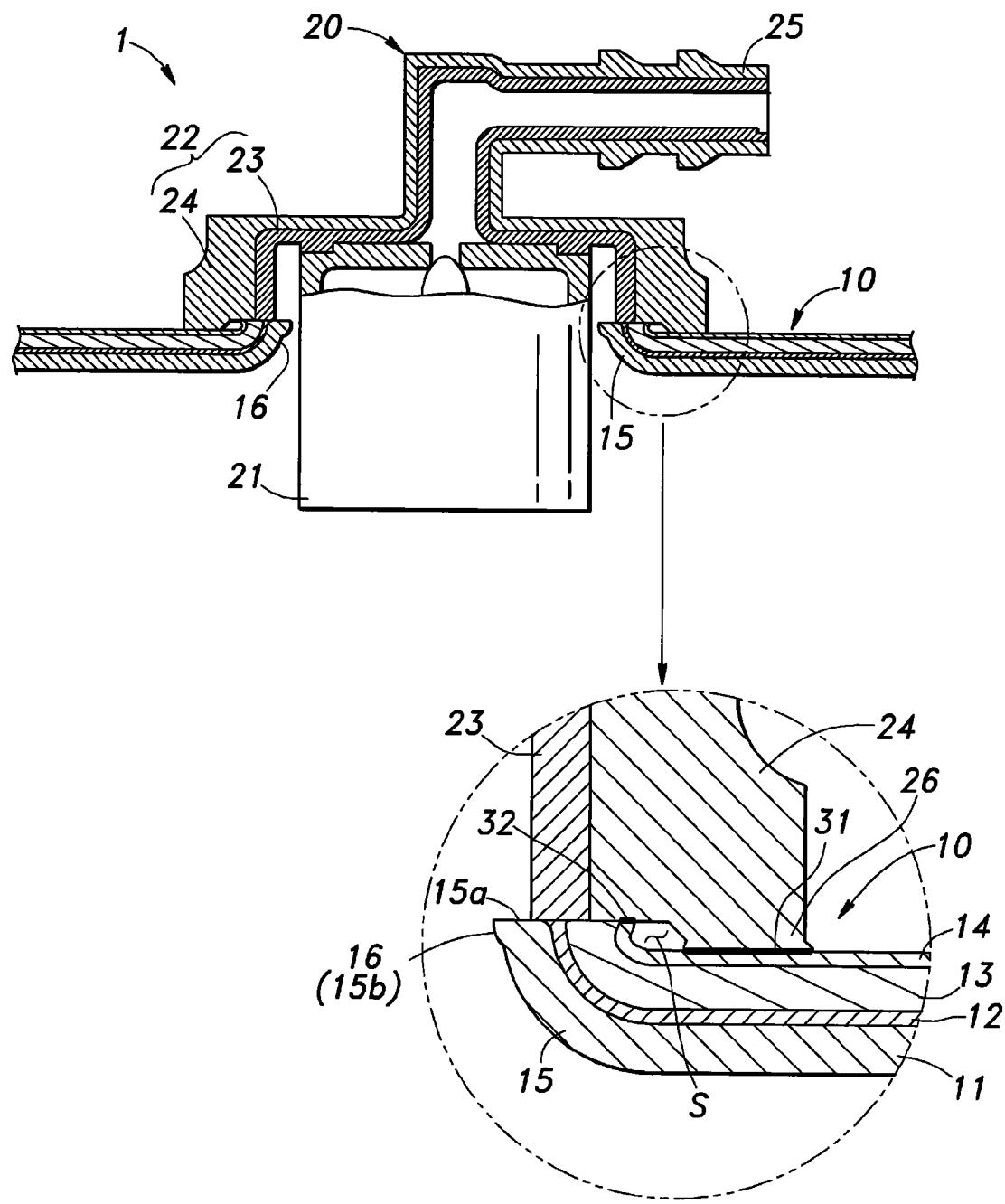
FIG. 12 is a view similar to FIG. 1 showing a fifth embodiment of the present invention.

FIGS. 12 to 14 show a fifth embodiment of the present invention. In these drawings, the parts corresponding to those of the previous embodiments are denoted with like numerals without repeating the description of such parts.

In this embodiment, the opening 16 of the tank main body 10 is defined by an inner peripheral surface 15b of an annular upright wall 15 defining a top surface 15a, and the top surface 15a stands out from the outer surface of the outer surface of the weldable layer 14 surrounding the annular upright wall 15 of the tank main body 10. In other words, the top surface 15a is higher than the outer surface of the outer surface of the weldable layer 14 surrounding the annular upright wall 15 of the tank main body 10.

The lower end surface of the peripheral part of the lid part 22 of the vent valve 20 is provided with an annular protrusion 26 along the outermost peripheral part thereof. In other words, the lower end surface of the outer peripheral part of the weldable layer 24 of the lid part 22 includes a base surface and an annular protruding surface extending along the outer peripheral part of the lid part 22. The end surface of the HC barrier layer 23 of the lid part 22 is at the same height as the base surface of the lower end surface of the outer peripheral part of the weldable layer 24 of the lid part 22

When the lid part 22 is welded to the tank main body 10, the annular protruding surface is welded with the opposing outer surface of the tank main body 10 defined by the weldable layer 14 thereof (first welded part 31). At the same time, the end surface of the weldable layer 14 abuts the base surface of the weldable layer 24 of the lid part 22, and is welded thereto (second welded part 32). In this embodiment also, when the lid part 22 is welded to the tank main body 10, the opposing ends of the HC barrier layers 14 and 24 of the two parts abut each other in a continuous manner.

The outer periphery of the annular upright wall 15 is located radially inward to the inner periphery of the annular protrusion 26 so that an annular space S is defined between the annular upright wall 15 and the annular protrusion 26. This annular space S performs the function of receiving the flow of the material of the weldable layers 14 and 24.

The height of the annular protrusion 26 from the base surface may be about equal to or slightly higher than the height of the top surface 15a of the annular upright wall 15 from the outer surface of the outer surface of the weldable layer 14 surrounding the annular upright wall 15 of the tank main body 10.

In this embodiment also, the HC barrier layer 12 of the annular upright wall 15 and the HC barrier layer 23 of the lid member 22 extend continuously one from the other across the welding surface between the two parts so that a favorable HC barrier property can be achieved. Furthermore, as the welding between the two parts is performed over a large welding area, the welded part can be given with a high mechanical strength.

The welding process for this embodiment is described in the following with reference to FIGS. 13a to 13f.

Figure 13A:
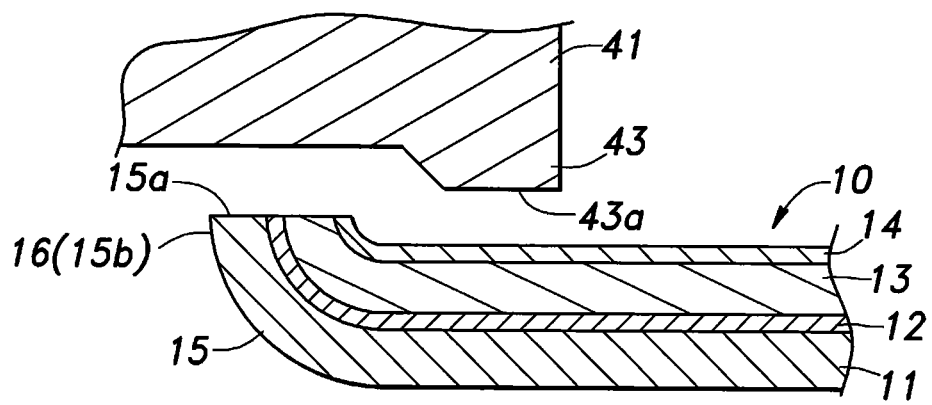
FIGS. 13a to 13f are fragmentary sectional views showing the different steps of welding a component part to the tank main body according to the fifth embodiment of the present invention.

A heating plate 41 having a lower base surface for heating the top surface 15a of the annular upright wall 15 and an annular protrusion 43 for heating the part of the outer surface of the tank main body 10 surrounding the opening 16 is prepared as shown in FIG. 13a.

Figure 13B:
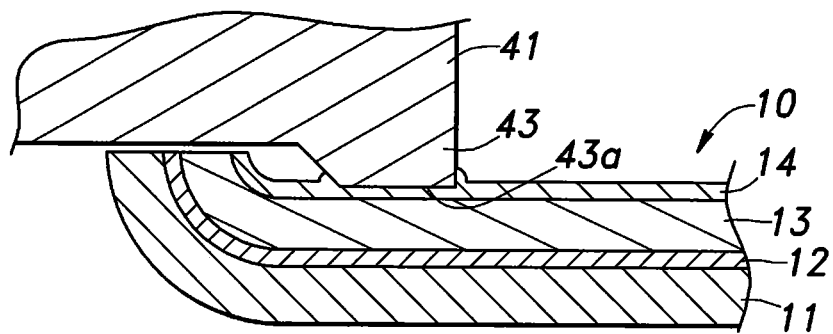

The height of the lower surface 43a of the annular protrusion 43 as measured from the base surface thereof is slightly greater than that of the top surface 15a of the annular upright wall 15 as measured from the outer surface of the outer surface of the weldable layer 14 surrounding the annular upright wall 15 of the tank main body 10. Therefore, as the heating plate 41 is pressed against the outer surface of the tank main body 10, the annular protrusion 43 is first pushed into the weldable layer 14 of the tank main body 10, and the base surface of the heating plate 41 is then pressed against the top surface 15a of the annular upright wall 15 as shown in FIG. 13b.

Figure 13C:
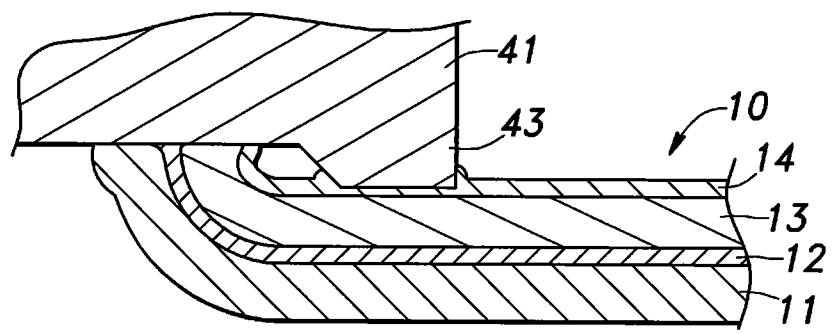

During this process, the material of the annular upright wall 15 (the recycled material layer 13 and the weldable layer 14) is allowed to flow into the space S as shown in FIG. 13c. To a less extent, part of the material of the weldable layer 14 pressed by the annular protrusion 43 is also allowed to flow into the space S. Furthermore, the annular protrusion 43 creates a corresponding annular dent in the weldable layer 14.

Figure 13D:
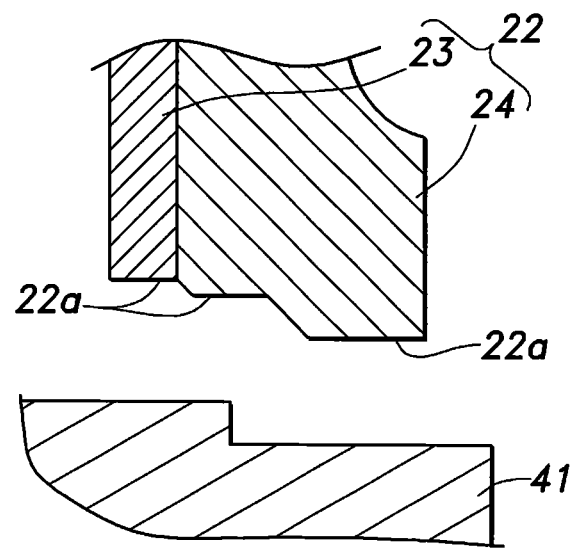
Figure 13E:
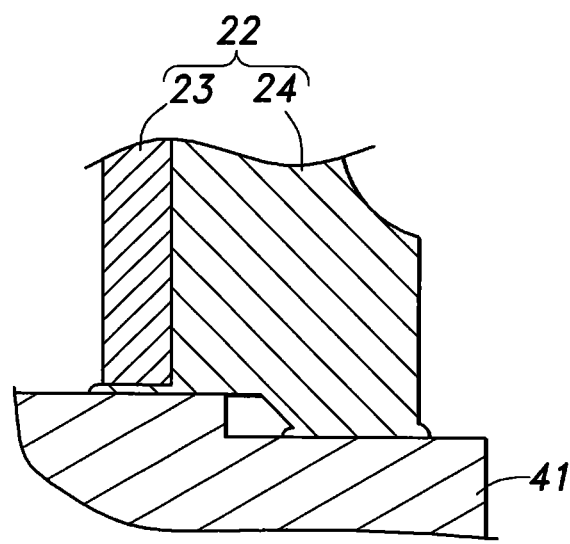

At the same time, the heating plate 41 is applied to the lower end surface of the peripheral part of the lid part 22 as shown in FIGS. 13d and 13e. The upper surface of the heating plate 41 is provided with an annular stepped surface contour so as to conform to the lower end surface of the peripheral part of the lid part 22.

Figure 13F:
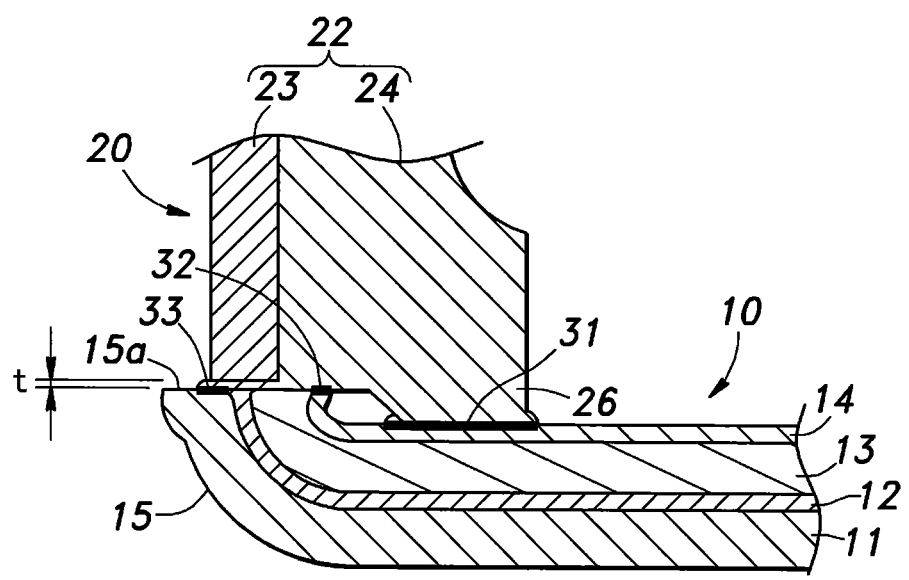

Thereafter, the vent valve 20 is attached to the tank main body 10 by welding the weldable layer 24 of the lid part 22 to the weldable layer 14 of the tank main body 10 while the HC barrier layer 12 exposed at the top surface 15a of the annular upright wall 15 abuts the opposing end of the HC barrier layer 23 of the lid part 22 as shown in FIG. 13f. In particular, the weldable layer 24 of the lid part 22 is welded to the weldable layer 14 of the tank main body 10 at the top surface of the annular protuberance 18 (a first annular welded part 31) and at the top surface 15a of the annular upright wall 15 (a second annular welded part 32).

The welded parts are allowed to cool off thereafter. Thereby, the two parts are firmly welded to each other by the welded parts thereof. In particular, the weldable layer 14 presents a relatively large surface area on the top surface 15a of the annular upright wall 15 of the tank main body 10, and on the annular top surface of the annular protuberance 18 that can be welded to the opposing end surface of the weldable layer 24 of the lid part 22 so that a particularly firm welding connection can be accomplished. In particular, the annular protrusion 26 of the weldable layer 24 of the lid part 22 fits into the corresponding dent in the weldable layer 14 of the tank main body 10 so that a particularly favorable welding attachment can be achieved.

According to this embodiment, even when the top surface 15a of the annular upright wall 15 is slightly higher than the top surface of the surrounding annular protuberance 18 owing to the need to cut the dome-shaped protuberance 19 without damaging the surrounding annular protuberance 18, because of the presence of the annular projection 42 in the heating plate 41, the material of the tank main body (the recycled material layer 13 and the weldable layer 14) can be contained within a prescribed area so that the part of the weldable layer 14 outside the annular projection 42 is protected from the inclusion of any foreign matter from such part as the recycled material layer 13, and a firm welding attachment can be ensured between the weldable layers 14 and 24 of the two parts as shown in FIG. 13f.

Figure 14A:
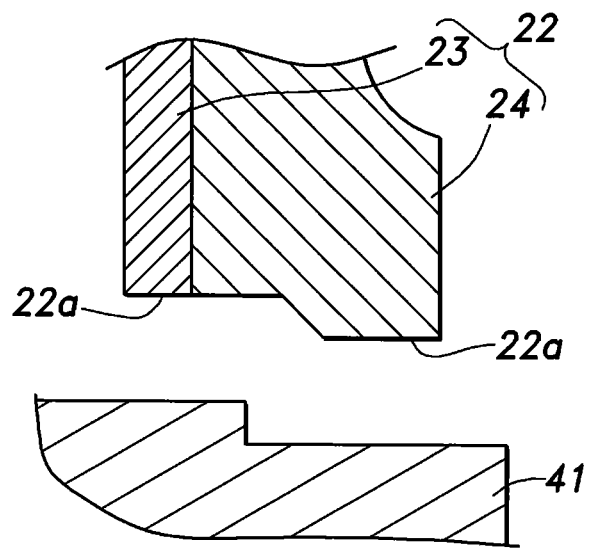
FIGS. 14a to 14c are views similar to FIGS. 13d to 13f showing a modification of the fifth embodiment of the present invention.
Figure 14B:
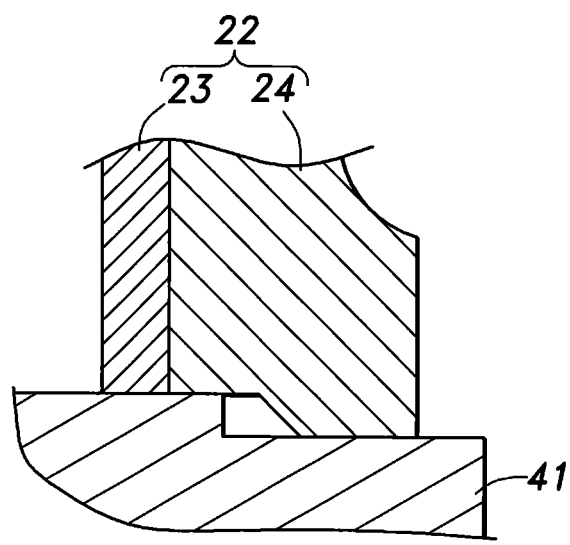
Figure 14C:
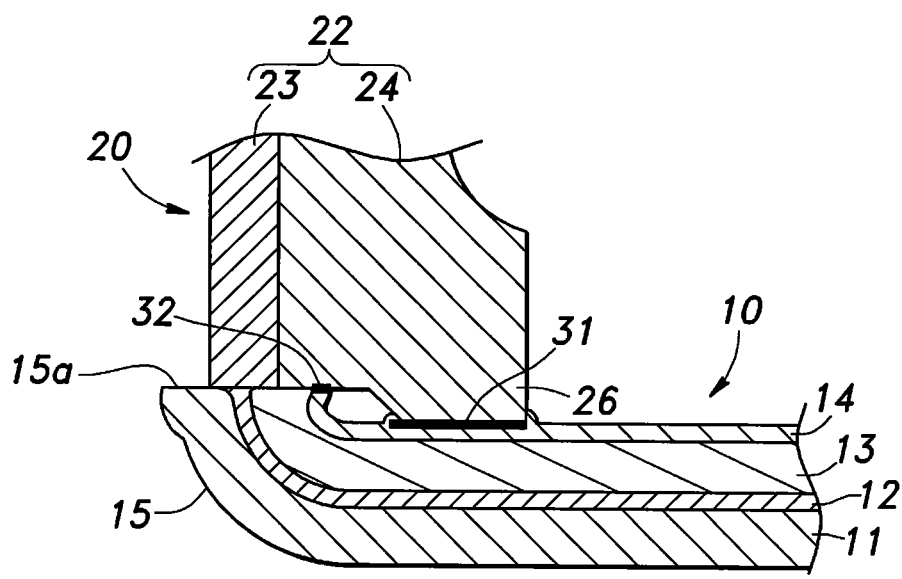

FIGS. 14a to 14c show a modification of the fifth embodiment. This embodiment differs from the previous embodiment in that the end surface of the weldable layer 24 of the lid part 22 protrudes slightly as compared with the end surface of the adjacent HC barrier layer 23 as shown in FIG. 11a. Therefore, when the lower surface of the lid part 22 is heated, and the lid part 22 is pushed against the top surface of the annular upright wall 15, the material of the weldable layer 24 of the lid part 22 is allowed to flow into the gap between the opposing ends of the HC barrier layers 23 and 12 of the two parts as and welded to the end surface of the inner lining layer 11 (a third welded part 33) shown in FIG. 14c.

As a result, when the two parts are welded to each other, a small gap t is defined between opposing ends of the HC barrier layers 23 and 12 of the two parts, and filled by the material of the weldable layer 24 of the lid part 22 as shown in FIG. 14c. This gap t is so small that fuel permeation through this gap t is negligible. On the other hand, the filling of this gap t with the material of the weldable layer 24 of the lid part 22 contributes to the welding strength of the two parts, and may even reduce the amount of fuel permeation through the welded part when the opposing ends of the two HC barrier layers 12 and 23 do not closely abut each other and create a gap between them.

In the foregoing embodiments, the tank main body 10 consisted of four layers. However, the present invention is not limited by the illustrated embodiments, and may have a fewer or a larger number of layers without departing from the spirit of the present invention.

Figure 15A:
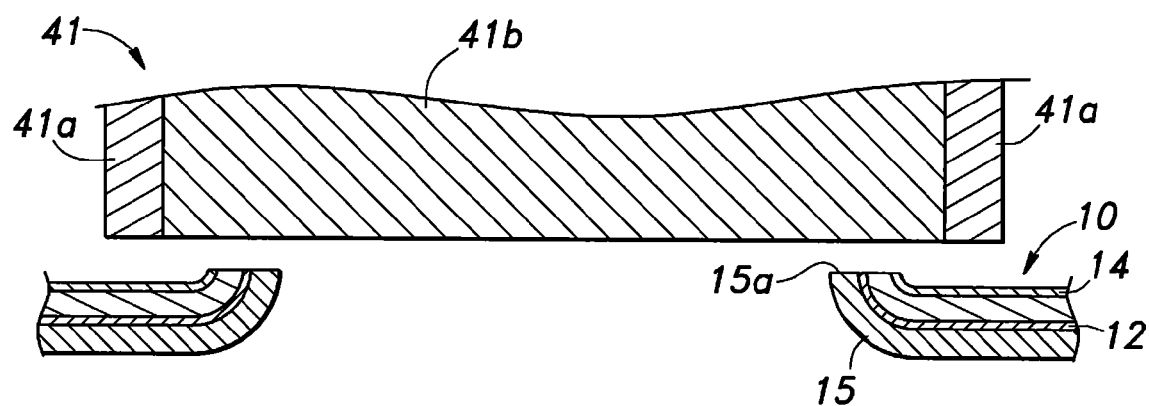
FIGS. 15a to 15d are fragmentary sectional views showing the different steps of welding a component part to the tank main body using a certain heating plate according to a sixth embodiment of the present invention.

FIGS. 15a to 15d show a heating plate 41 that can be advantageously used in some of the embodiments of the present invention such as the fifth embodiment. As shown in FIG. 15a, this heating plate 41 includes an annular part 41a having a certain radial thickness, and a central part 41b received inside the annular part 41a in a sliding engagement and having a lower surface configured to engage at least the entire top surface 15a of the annular upright wall 15 with some margin. Therefore, the inner circumferential surface of the annular part 41a defines a slightly larger radial dimension than the outer circumferential surface of the annular upright wall 15.

Figure 15B:
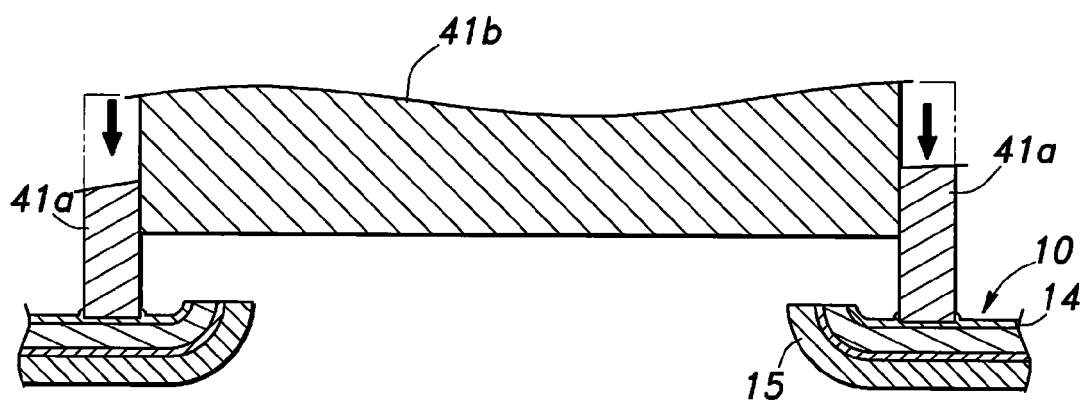

Initially, the annular part 41a of the heating plate 41 is moved toward the surrounding part of the annular upright wall 15, and is pushed into the weldable layer 14 of the tank main body 10 as shown in FIG. 15b.

Figure 15C:
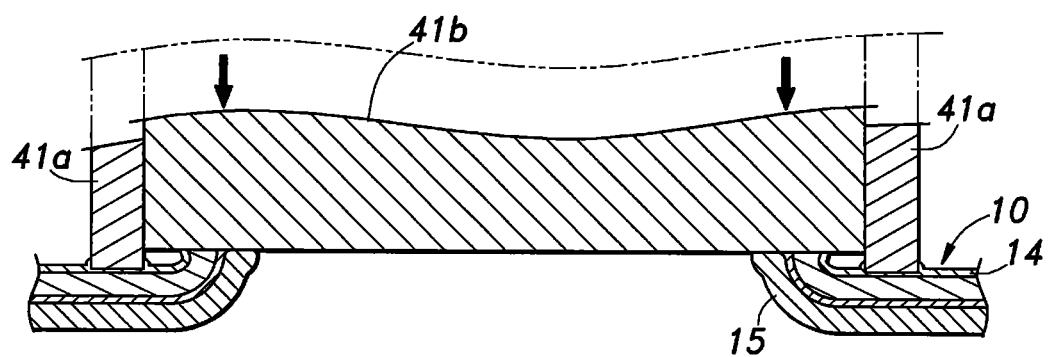
Figure 15D:
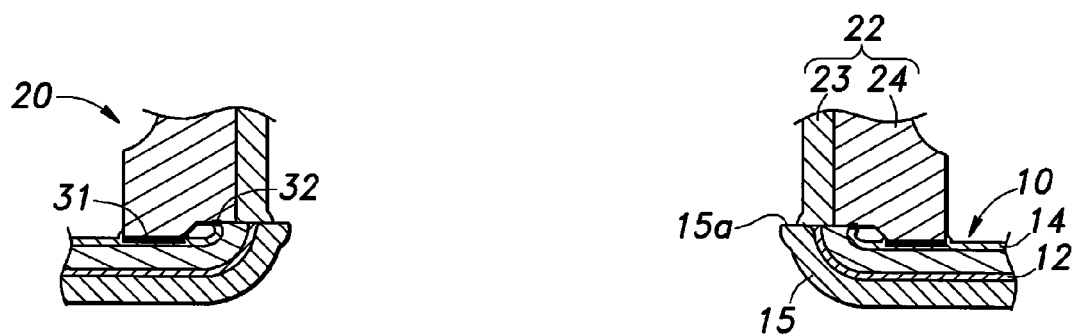

Thereafter, the central part 41b is pushed against the top surface 15a of the annular upright wall 15 until the corresponding part of the annular upright wall 15 collapses to a certain extent by the heat and pressure of the heating plate 41 as shown in FIG. 15c.

Thereafter, the lower end surface of the peripheral part of the lid part 21 of the vent valve 20 is heated as described in connection with the fifth embodiment, and the vent valve 20 is attached to the tank main body 10 by welding the weldable layer 24 of the lid part 22 to the weldable layer 14 of the tank main body 10 while the HC barrier layer 12 exposed at the top surface 15a of the annular upright wall 15 abuts the opposing end of the HC barrier layer 23 of the lid part 22. In particular, the weldable layer 24 of the lid part 22 is welded to the weldable layer 14 of the tank main body 10 at the top surface of the annular protuberance 18 (a first annular welded part 31) and at the top surface 15a of the annular upright wall 15 (a second annular welded part 32).

The welded part is allowed to cool off thereafter. Thereby, the two parts are firmly welded to each other by the weldable layers thereof In particular, the weldable layer 14 presents a relatively large surface on the top surface 15a of the annular upright wall 15 of the tank, and on the annular top surface of the annular protuberance 18 that can be welded to the opposing end surface of the weldable layer 24 of the lid part 22 so that a particularly firm welding connection can be accomplished. In particular, the annular protrusion 26 of the weldable layer 24 of the lid part 22 fits into the corresponding dent in the weldable layer 14 of the tank main body 10, a favorable welding attachment can be achieved.

Although the present invention has been described in terms of preferred embodiments thereof, it is obvious to a person skilled in the art that various alterations and modifications are possible without departing from the scope of the present invention which is set forth in the appended claims.

The contents of the original Japanese patent applications on which the Paris Convention priority claim is made for the present application as well as the contents of the prior art references mentioned in this application are incorporated in this application by reference.

The invention claimed is:

1. A method of welding a component part provided with a peripheral wall including an inner HC barrier layer and an outer weldable layer and defining an annular lower end surface exposing end surfaces of the inner HC barrier layer and the outer weldable layer thereof to a tank main body of a plastic fuel tank of a laminated structure including an inner layer, a HC barrier layer, a recycled material layer made of recycled material and an outer weldable layer, in that order, the method comprising the steps of:

forming an annular upright wall in a wall of the tank main body, the annular upright wall including an inner peripheral surface defining an opening of the tank main body and an annular top surface exposing end surfaces of at least the HC barrier layer and the outer weldable layer; and welding the end surface of the weldable layer of the component part to an outer surface of the weldable layer of the tank main body surrounding the annular upright wall to form a first welded part and to the end surface of the weldable layer of the tank main body exposed at the top surface of the annular upright wall to form a second welded part while the HC barrier layers exposed at the top surface of the annular upright wall and the lower end surface of the peripheral wall of the component part, respectively, are kept substantially aligned with each other.

2. The welding method according to claim 1, wherein an annular recess is formed around the annular upright wall so as to define an annular space between the first welded part and the second welded part.

3. The welding method according to claim 2, wherein the end surface of the weldable layer of the component part is slightly higher than the end surface of the HC barrier layer of the component part.

4. The welding method according to claim 1, wherein the top surface of the annular upright wall is substantially higher than an outer surface of the weldable layer of the tank main body surrounding the annular upright wall, and the end surface of the weldable layer of the component part includes a base surface substantially flush with the end surface of the HC barrier layer of the component part and an annular protrusion formed along an outer periphery of the end surface of the weldable layer so as to define an annular space between the first welded part and the second welded part.

5. The welding method according to claim 1, wherein the top surface of the annular upright wall is substantially higher than an outer surface of the weldable layer of the tank main body surrounding the annular upright wall, the end surface of the weldable layer of the component part includes a base surface slightly protruding with respect to the end surface of the HC barrier layer of the component part and an annular protrusion formed along an outer periphery of the end surface of the weldable layer so as to define an annular space between the first welded part and the second welded part.

6. The welding method according to claim 1, wherein the end surface of the weldable layer of the component part is substantially flush with the end surface of the HC barrier layer of the component part, and the top surface of the annular upright wall is substantially flush with an outer surface of the weldable layer of the tank main body surrounding the annular upright wall.

7. The welding method according to claim 1, wherein the end surface of the weldable layer of the component part includes a base surface slightly protruding with respect to the end surface of the HC barrier layer of the component part and an annular protrusion formed along an outer periphery of the end surface of the weldable layer, and the top surface of the annular upright wall is substantially flush with an outer surface of the weldable layer of the tank main body surrounding the annular upright wall so as to define an annular space between the first welded part and the second welded part.

8. The welding method according to claim 1, wherein the top surface of the annular upright wall of the tank main body and a part of the outer surface of the weldable layer surrounding the annular upright wall are heated by using a heating plate provided with a base surface engaging the top surface of the annular upright wall and an annular projection engaging a part of the outer surface of the weldable layer surrounding the annular upright wall.

9. The welding method according to claim 8, wherein the end surface of the weldable layer of the component part includes a base surface slightly protruding with respect to the end surface of the HC barrier layer of the component part.

10. The welding method according to claim 1, wherein the end surface of the weldable layer of the component part includes a base surface substantially flush with the end surface of the HC barrier layer of the component part and an annular protrusion formed along an outer periphery of the end surface of the weldable layer, and the top surface of the annular upright wall of the tank main body is slightly higher than a part of the outer surface of the weldable layer surrounding the annular upright wall so as to define an annular space between the first welded part and the second welded part; and wherein the top surface of the annular upright wall of the tank main body and a surrounding part of the tank main body is heated by a heating plate including a base surface engaging the top surface of the annular upright wall and an annular protrusion engaging the outer surface of the surrounding part of the tank main body, the height of the annular protrusion from the base surface being slightly greater than the height of the top surface of the annular upright wall from the outer surface of the weldable layer surrounding the annular upright wall of the tank main body.

11. The welding method according to claim 1, wherein the end surface of the weldable layer of the component part includes a base surface slightly protruding with respect to the end surface of the HC barrier layer of the component part and an annular protrusion formed along an outer periphery of the end surface of the weldable layer, and the top surface of the annular upright wall of the tank main body is higher than a part of the outer surface of the weldable layer surrounding the annular upright wall so as to define an annular space between the first welded part and the second welded part; and wherein the top surface of the annular upright wall of the tank main body and a surrounding part of the tank main body is heated by a heating plate including a base surface engaging the top surface of the annular upright wall and an annular protrusion engaging the outer surface of the surrounding part of the tank main body, the height of the annular protrusion from the base surface being slightly greater than the height of the top surface of the annular upright wall from the outer surface of the weldable layer surrounding the annular upright wall of the tank main body.

12. The welding method according to claim 1, wherein the top surface of the annular upright wall of the tank main body and a surrounding part of the tank main body is heated by a heating plate including a central part configured to engage the top surface of the annular upright wall and an annular part configured to engage the outer surface of the weldable layer of the tank main body surrounding the annular upright wall, the central part and the annular part of the heating plate being disposed in a mutually slidable relationship in a direction for moving the heating plate toward the tank main body.

13. The welding method according to claim 1, wherein the annular upright wall is formed by forming an outwardly directed dome-shaped protuberance in the tank main body of the fuel tank and cutting off the dome-shaped protuberance from the tank main body along a base part thereof.

* * * * *